(12) United States Patent
Matsuno

(10) Patent No.: US 7,607,506 B2
(45) Date of Patent: Oct. 27, 2009

(54) DRIVING FORCE DISTRIBUTION CONTROL APPARATUS OF VEHICLE

(75) Inventor: Koji Matsuno, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 480 days.

(21) Appl. No.: 11/254,889

(22) Filed: Oct. 21, 2005

(65) Prior Publication Data

US 2006/0086556 A1    Apr. 27, 2006

(30) Foreign Application Priority Data

Oct. 21, 2004    (JP)    ............................. 2004-307184

(51) Int. Cl.
B60K 17/344    (2006.01)
B60K 28/16    (2006.01)
B62D 5/18    (2006.01)
B62D 6/00    (2006.01)

(52) U.S. Cl. ........................ 180/248; 180/197; 180/446; 701/41

(58) Field of Classification Search ................. 180/197, 180/248, 446; 701/41
See application file for complete search history.

(56) References Cited

U.S. PATENT DOCUMENTS

| | | | | |
|---|---|---|---|---|
| 5,259,476 | A | * | 11/1993 | Matsuno et al. ............. 180/197 |
| 5,262,950 | A | * | 11/1993 | Nakayama ................... 701/36 |
| 5,742,917 | A | * | 4/1998 | Matsuno ...................... 701/69 |
| 6,415,215 | B1 | * | 7/2002 | Nishizaki et al. .............. 701/70 |
| 6,453,228 | B1 | * | 9/2002 | Shimada ....................... 701/89 |
| 7,264,077 | B2 | * | 9/2007 | Mori et al. ................... 180/233 |
| 7,516,006 | B2 | * | 4/2009 | Mori ............................ 701/69 |
| 2002/0002433 | A1 | | 1/2002 | Matsuno |
| 2004/0129474 | A1 | | 7/2004 | Bastian et al. |
| 2005/0075771 | A1 | | 4/2005 | Matsuno |
| 2009/0037053 | A1 | * | 2/2009 | Yamazaki .................... 701/41 |

FOREIGN PATENT DOCUMENTS

| | | |
|---|---|---|
| EP | 1 403 122 | 3/2004 |
| JP | 7-108840 A | 4/1995 |
| JP | 11-263140 | 9/1999 |

* cited by examiner

Primary Examiner—Lesley D Morris
Assistant Examiner—Daniel Yeagley
(74) Attorney, Agent, or Firm—Smith, Gambrell & Russell, LLP

(57) ABSTRACT

A driving force distribution control unit 60 calculates front/rear driving force distribution cooperative control addition yaw moment by multiplying front/rear driving force distribution control addition yaw moment by a front/rear driving force distribution cooperative control gain. Under steering accelerating condition, when it is possible to judge that actual lateral acceleration is high and the road is a high μ road, the front/rear driving force distribution cooperative control gain is set to become a low control gain so as to reduce a control amount by the front/rear driving force distribution control operation. Also, the driving force distribution control unit 60 calculates right/left driving force distribution cooperative control addition yaw moment by multiplying right/left driving force distribution control addition yaw moment by a right/left driving force distribution cooperative control gain. Under steering accelerating condition, when it is possible to judge that actual lateral acceleration is low and the road is a low μ road, the right/left driving force distribution cooperative control gain is set to become a low control gain so as to reduce a control amount by the right/left driving force distribution control operation.

17 Claims, 12 Drawing Sheets

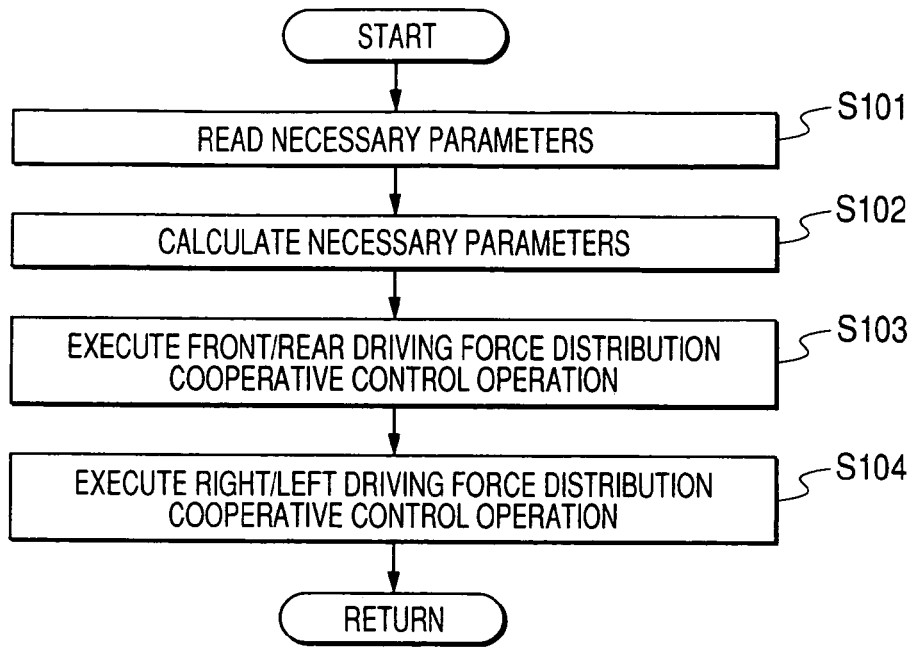
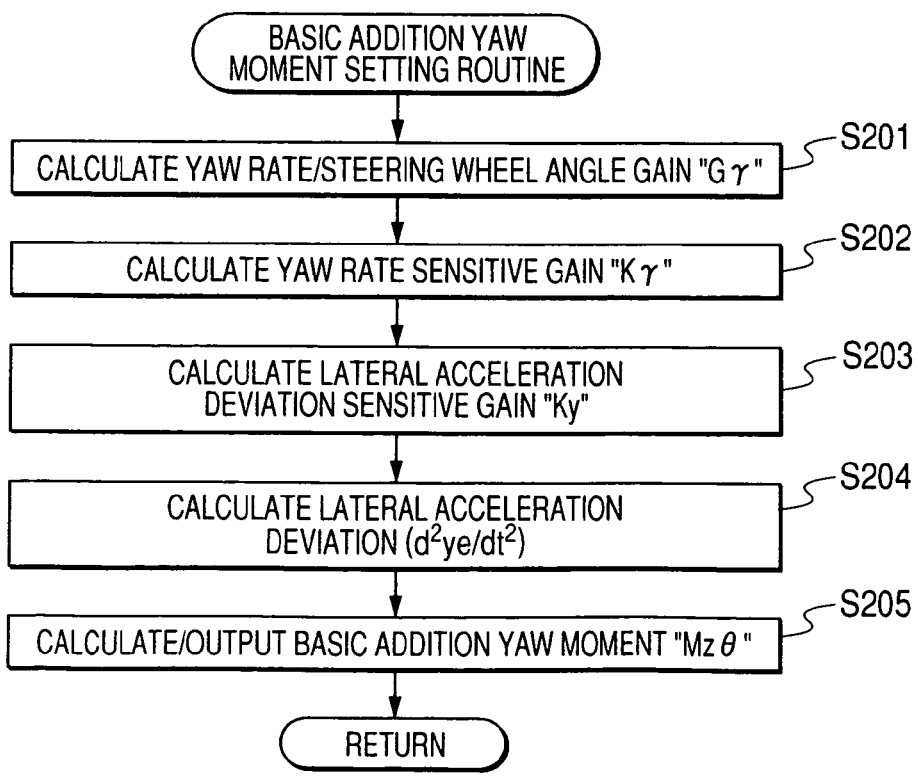

DRIVING FORCE DISTRIBUTION CONTROL APPARATUS OF VEHICLE

CROSS REFERENCE TO RELATED APPLICATIONS

The present application claims foreign priority based on Japanese Patent Application No. P.2004-307184, filed on Oct. 21, 2004, the contents of which are incorporated herein by reference.

BACKGROUND OF THE INVENTION

1. Field of the Invention

The present invention is related to a driving force distribution control apparatus for performing both a driving force distribution between a front wheel and a rear wheel and a driving force distribution between a left wheel and a right wheel.

2. Related Art

Recently, a large number of technical ideas as to vehicles have been proposed which actively control not only driving force distributions between front wheels and rear wheels, but also driving force distributions between right wheels and left wheels in order to improve stabilities and turning round characteristics of these vehicles.

For instance, disclosed in JP-A-07-108840 is a technical idea capable of controlling a torque distribution between a front wheel and a rear wheel by a differential limiting clutch provided on a center differential, and also capable of controlling a torque distribution between a left wheel and a right wheel by a torque transfer mechanism. The torque transfer mechanism is constituted by a gear shifter mechanism and a transfer capacity variable control type torque transfer mechanism, which are provided on a rear differential.

However, the technical idea disclosed in JP-A-07-108840 owns the following problem. That is, since the driving force distribution control for the front and rear wheels and the driving force distribution control for the right and left wheels are independently carried out in response to the driving conditions of the vehicle, in such a case that both the control operation by which the driving force of the front and rear wheels is distributed so as to apply yaw moment to the vehicle, and the control operation by which the driving force of the right and left wheels is distributed so as to apply yaw moment to the vehicle are actuated, these control operations may be overlapped with each other, or may interfere with each other, depending upon the operation timing thereof. Then, the vehicle is brought into unstable driving condition, or the target effect may not be achieved in accordance with values of yaw moment which are applied to the vehicle.

SUMMARY OF THE INVENTION

One or more embodiments of the present invention provides a driving force distribution control apparatus capable of properly actuating both a driving force distribution control operation of front and rear wheels and a driving force distribution control operation of right and left wheels, while these distribution control operations own the maximum effects in various vehicle driving scenes, and also, capable of maintaining both a stability and a turning round characteristic of the vehicle under optimum characteristics.

In accordance with one or more embodiment of the present invention, a driving force distribution control apparatus is provided with a front/rear driving force distribution controller for controlling a driving force distribution between a front wheel side and a rear wheel side; and a right/left driving force distribution controller for controlling a driving force distribution between a left wheel and a right wheel of at least one of the front wheel side and the rear wheel side. In the driving force distribution control apparatus, when a predetermined steering drive condition on a high μ road is satisfied, a control amount by the front/rear driving force distribution controller is decreased in response to at least an accelerating condition, and when a predetermined steering drive condition on a low μ road is satisfied, a control amount set by the right/left driving force distribution controller is decreased in response to at least the accelerating condition.

Other aspects and advantages of the invention will be apparent from the following description and the appended claims.

BRIEF DESCRIPTION OF THE DRAWINGS

FIG. 7 is a flow chart for describing a driving force distribution control program.

FIG. 8 is a flow chart for explaining a basic addition yaw moment setting routine.

Figure 1:
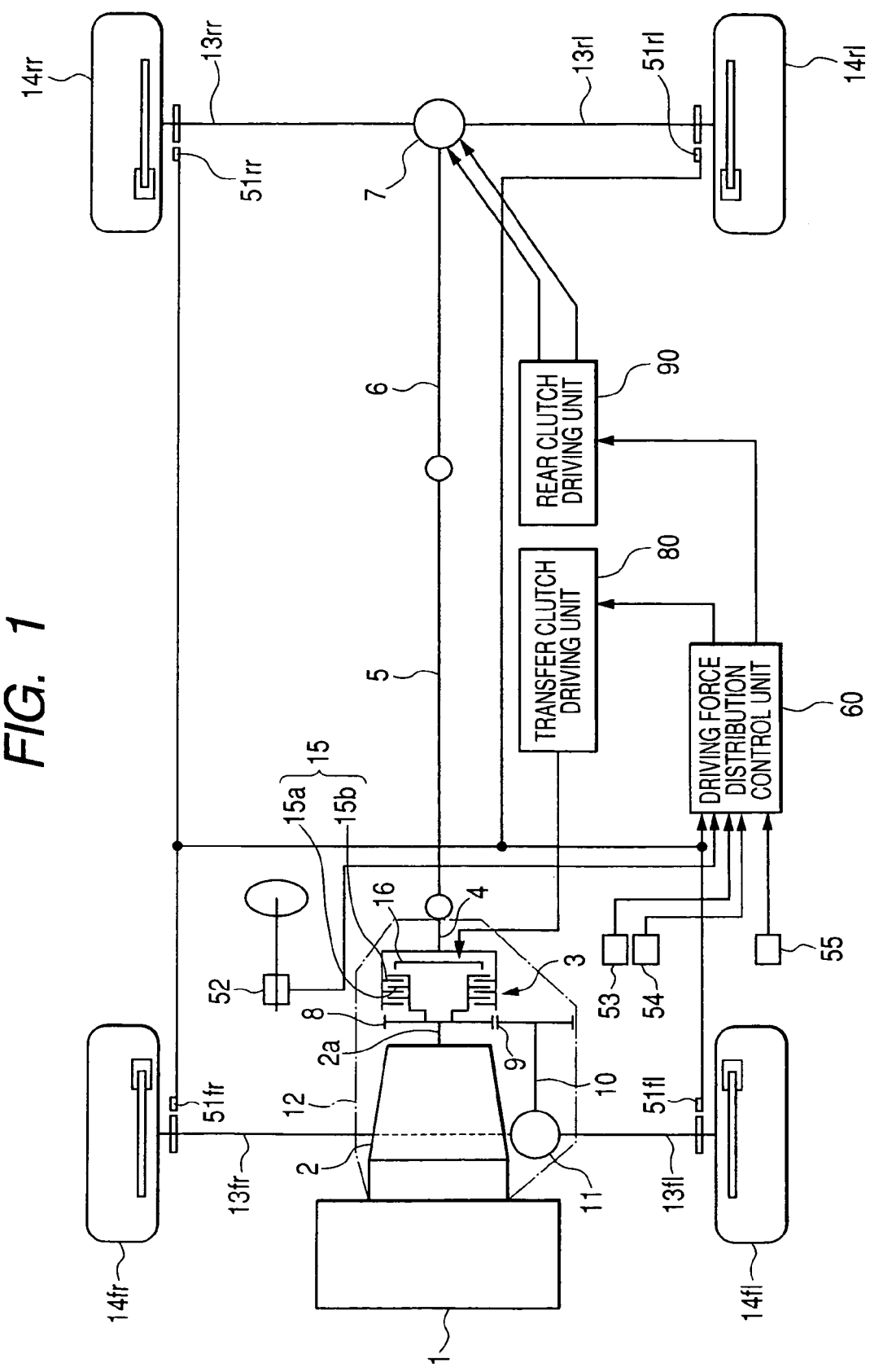
FIG. 1 is an explanatory diagram for showing a schematic structure of an entire driving system of a vehicle.

REFERENCE NUMERALS AND CHARACTERS 3 transfer;
7 rear wheel final reduction gear apparatus;
14*fl*, 14*fr*, 14*rl*, 14*rr* wheel;
15 transfer clutch;
30 differential mechanism unit;
31 gear mechanism unit;
32 clutch mechanism unit;
48 first oil pressure multi-plate clutch;
49 second oil pressure multi-plate clutch;
60 driving force distribution control unit (front/rear driving force distribution controller, right/left driving force distribution controller);
61 vehicle speed calculating unit;
62 lateral acceleration/steering wheel angle gain calculating unit;
63 reference lateral acceleration calculating unit;
64 reference addition yaw moment setting unit;
65 reference front/rear acceleration calculating unit;
66 front/rear driving force distribution control addition yaw moment setting unit;
67 front/rear driving force distribution cooperative control gain calculating unit;
68 front/rear driving force distribution cooperative control addition yaw moment calculating unit;
69 transfer clutch torque converting control unit;
70 right/left driving force distribution control addition yaw moment setting unit;
71 right/left driving force distribution cooperative control gain calculating unit;
73 rear clutch torque converting control unit;
80 transfer clutch torque driving unit;
90 rear clutch driving unit

DESCRIPTION OF THE PREFERRED EMBODIMENTS

Embodiments of the invention will be described with reference to the accompanying drawings.

In FIG. 1, reference numeral 1 indicates an engine which is arranged at a front portion of a vehicle. The driving force produced from this engine 1 is transferred from an automatic gear shifter apparatus 2 (which is illustrated, while torque converter and the like are also contained) arranged at a rear portion of the engine 1 via a transmission power shaft 2*a* to a transfer.

Further, the driving force transferred to the transfer 3 is entered via a rear drive shaft 4, a propeller shaft 5, and a drive pinion shaft unit 6 to a rear wheel final reduction gear apparatus 7, and on the other hand, is entered via a reduction drive gear 8, a reduction driven gear 9, and a front drive shaft 10 which constitutes a drive pinion shaft unit, to a front wheel final reduction gear apparatus 11. In this case, the automatic gear shifter apparatus 2, the transfer 3, the front wheel final reduction gear apparatus 11, and the like have been provided in a case 12.

Also, the driving force entered to the rear wheel final reduction gear apparatus 7 is transferred via a left rear wheel drive shaft 13*rl* to a left rear wheel 14*rl*, and is transferred via a right rear wheel drive shaft 13*rr* to a right real wheel 14*rr*. In this case, the rear wheel final reduction gear apparatus 7 has been constituted by employing a right/left driving force distribution mechanism (will be explained later).

On the other hand, the driving force entered to the front wheel final reduction gear apparatus 11 is transferred via a left front wheel drive shaft 13*fl* to a left front wheel 14*fl*, and is transferred via a right front wheel drive shaft 13*fr* to a right front wheel 14*fr*.

The transfer 3 has been constituted by employing a wet type multi-plate clutch (transfer clutch) 15, and a transfer piston 16. The wet type multi-plate clutch 15 functions as a torque transfer capacity variable type clutch, and is arranged by alternately overlapping a drive plate 15*a* provided on the side of the reduction drive gear 8 and a driven plate 15*b* provided on the side of the rear drive shaft 4. The transfer piston 16 applies transfer clutch torque of the transfer clutch 15 in a variable manner.

As a consequence, this vehicle may constitute a front engine/front drive vehicle based (FF based) four-wheel drive vehicle which can very a torque distribution ratio with respect to the front wheel and the rear wheel, for example, between 100:0 and 50:50 by controlling depression force produced by the transfer piston 16, and by controlling the transfer clutch torque of the transfer clutch 15.

Also, the depression force of the transfer piston 16 is applied by a transfer clutch driving unit 80 which is arranged by an oil pressure circuit containing a plurality of solenoid valves and the like. A control signal (namely, output signal produced in response to transfer clutch torque for solenoid valve) which drives this transfer clutch driving unit 80 is outputted from a driving force distribution control unit 60 (will be explained later).

Figure 2:
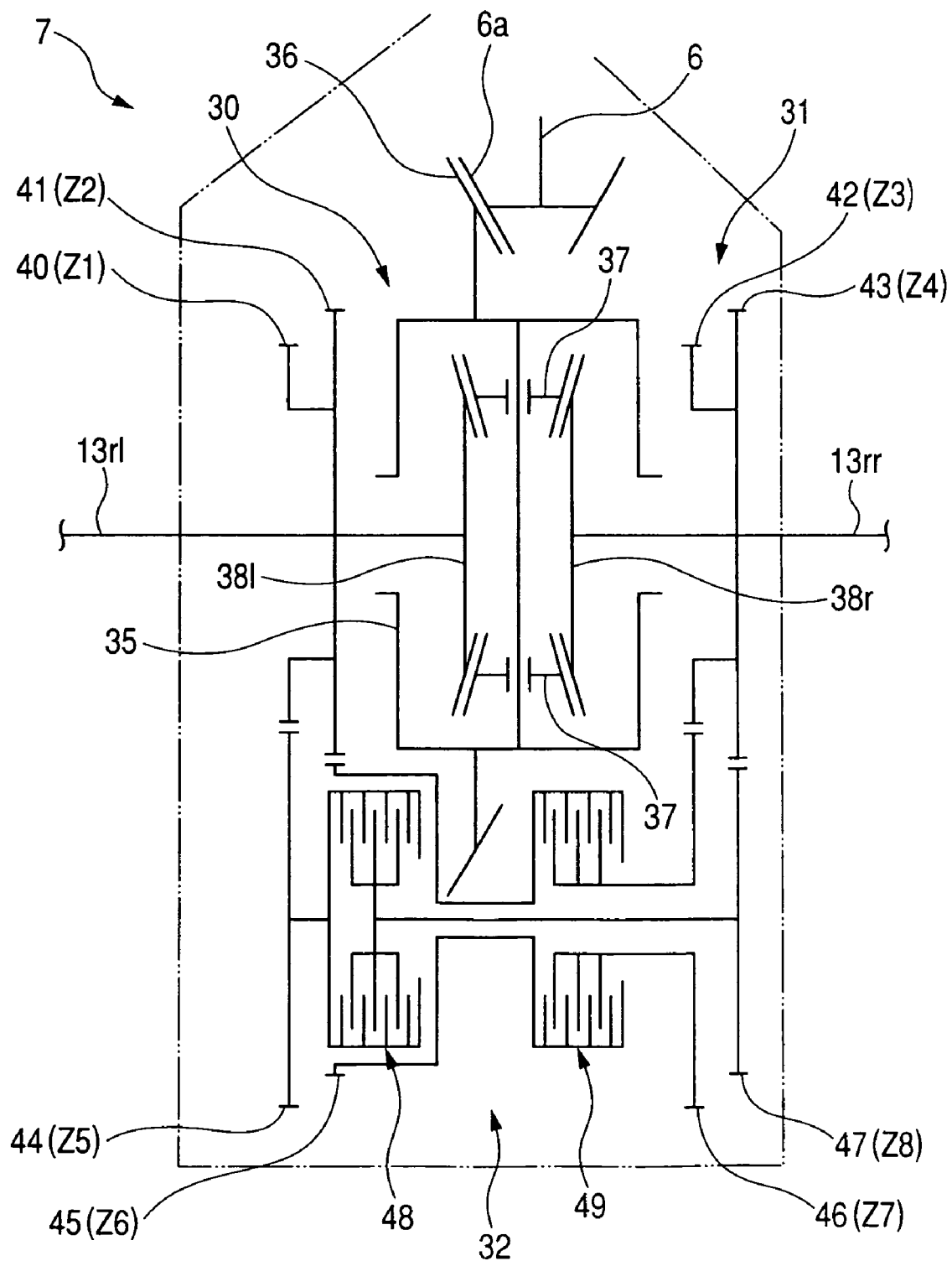
FIG. 2 is a schematic diagram for representing a right/left driving force distribution control apparatus.

On the other hand, the rear wheel final reduction gear apparatus 7 has been arranged in such a manner that a distribution of driving force to the left rear wheel 14*rl* and the right rear wheel 14*rr* can be freely controlled in a variable manner in response to a driving force distribution ratio set by a driving force distribution control unit 60 (will be discussed later). Concretely speaking, for example, as indicated in FIG. 2, this rear wheel final reduction gear apparatus 7 has been mainly arranged by employing a differential mechanism unit 30, a gear mechanism unit 31, and a clutch mechanism unit 32.

The differential mechanism 30 has been arranged by, for instance, a bevel gear type differential mechanism unit (differential apparatus). A final gear 36 has been formed in a circumferential manner on a differential case 35 of this differential mechanism unit 30, while this final gear 36 is meshed with a drive pinion 6*a* provided at a rear end of the drive pinion shaft unit 6.

One pair of differential pinions 37 have been pivotally supported within the differential case 35, and the left drive shaft 13*rl* and the right drive shaft 13*rr* have been coupled to a left side gear 38*l* and a right side gear 38*r*, which are meshed with these differential pinions 37.

The gear mechanism unit 31 has been arranged by employing first and second gears 40 and 41 which are fixedly provided on the left rear wheel drive shaft 13*rl*; third and fourth gears 42 and 43 which are fixedly provided on the right rear wheel drive shaft 13*rr*; and also, fifth to eighth gears 44 to 47 which are meshed with these first to fourth gears 40 to 43, respectively.

In this embodiment mode, the second gear 41 has been constituted by such a gear having a larger diameter than that of the first gear 40, and a total gear tooth number Z2 has been set to be larger than a gear tooth number Z1 of the first gear 40. Also, the third gear 42 has been constituted by such a gear having the same diameter (total gear tooth number Z3=Z1) as that of the first gear 40, and the fourth gear 43 has been constituted by such a gear having the same diameter (total gear tooth number Z4=Z2) as that of the second gear 41.

The fifth gear 44 to the eighth gear 47 have been arranged on an axial center of the same rotation shaft which is located parallel to the left drive shaft 13*rl* and the right drive shaft 13*rr*. The fifth gear 44 constructs a first gear train by being meshed with the first gear 40, and a total gear tooth number Z5 thereof has been set in such a manner that a gear ratio (Z5/Z1) of the first gear train is selected to be, for example, "1.0". Also, the sixth gear 45 constructs a second gear train by being meshed with the second gear 41, and a total gear tooth number Z6 thereof has been set in such a manner that a gear ratio (Z6/Z2) of the second gear train is selected to be, for example, "0.9". Also, the seventh gear 46 constructs a third gear train by being meshed with the third gear 42, and a total gear tooth number Z7 thereof has been set in such a manner that a gear ratio (Z7/Z3) of the third gear train is selected to be, for example, "1.0". Also, the eighth gear 47 constructs a fourth gear train by being meshed with the fourth gear 43, and a total gear tooth number Z8 thereof has been set in such a manner that a gear ratio (Z8/Z4) of the fourth gear train is selected to be, for example, "0.9".

The clutch mechanism unit 32 has been arranged by employing a first oil pressure multi-plate clutch 48 for engaging between the fifth gear 44 and the eighth gear 47 in a freely connecting/disconnecting manner, and a second oil pressure multi-plate clutch 49 for engaging between the sixth gear 45 and the seventh gear 46 in a freely connecting/disconnecting manner.

While a rear clutch driving unit 90 (refer to FIG. 1) has been connected to an oil pressure chamber (not shown) of each of the oil pressure multi-plate clutches 48 and 49, if the first oil pressure multi-plate clutch 48 is engaged by receiving the pressure of oil supplied from the rear clutch driving unit 90, then a large amount of driving force may be distributed to the left rear wheel drive shaft 13*rl*, and the other hand, if the second oil pressure multi-plate clutch 49 is engaged by receiving the pressure of oil supplied from the rear clutch driving unit 90, then a large amount of driving force may be distributed to the right rear wheel drive shaft 13*rr*.

In this case, an oil pressure value used to engage each of the oil pressure multi-plate clutches 48 and 49 corresponds to a value for actuating the rear clutch driving unit 90 in response to a control amount set by the driving force distribution control unit 60. A torque distribution amount may be varied, depending upon a large oil pressure value, or a small oil pressure value. It should be noted that a detailed structure of this sort of final reduction gear apparatus has been described in, for example, JP-A-11-263140, and is not limited only to the structure explained in this embodiment mode.

Then, sensors and the like have been provided with the vehicle, while these sensors are used so as to sense parameters which are required in a driving force distribution control operation executed in the driving force distribution control unit 60 (will be discussed later). In other words, wheel speeds ωfl, ωfr, ωrl, and ωrr of the respective wheels 14*fl*, 14*fr*, 14*rl*, and 14*rr* are detected by wheel speed sensors 51*fl*, 51*fr*, 51*rl*, and 51*rr*. A steering wheel angle "θH" is sensed by a steering wheel angle sensor 52; lateral acceleration (will be abbreviated as "actual lateral acceleration" hereinafter) ($d^2y/dt^2$) which is actually produced on the vehicle is sensed by a lateral acceleration sensor 53; front/rear acceleration (will be abbreviated as "actual front/rear acceleration" hereinafter) ($d^2xe/dt^2$) which is actually produced on the vehicle is sensed by a front/rear acceleration sensor 54; and a yaw rate (will be abbreviated as "actual yaw rate" hereinafter) (γ) which is actually provided on the vehicle is sensed by a yaw rate sensor 55, and then, the output signals of these sensors are inputted to the driving force distribution control unit 60.

The driving force distribution control unit 60 may have functions such as both a front/rear driving force distribution controller and a right/left driving force distribution controller. In response to each of the above-explained input signals, the driving force distribution control unit 60 calculates the front/rear driving force distribution by the transfer clutch 15 as transfer clutch torque TLSDV, and then, outputs the calculated transfer clutch torque TLSDV to the transfer clutch driving unit 80. Also, the driving force distribution control unit 60 calculates the right/left driving force distribution by the clutch mechanism unit 32 of the rear wheel final reduction gear apparatus 7 as rear clutch torque TRY, and then, outputs the calculated rear clutch torque TRY to the rear clutch driving unit 90.

Figure 3:
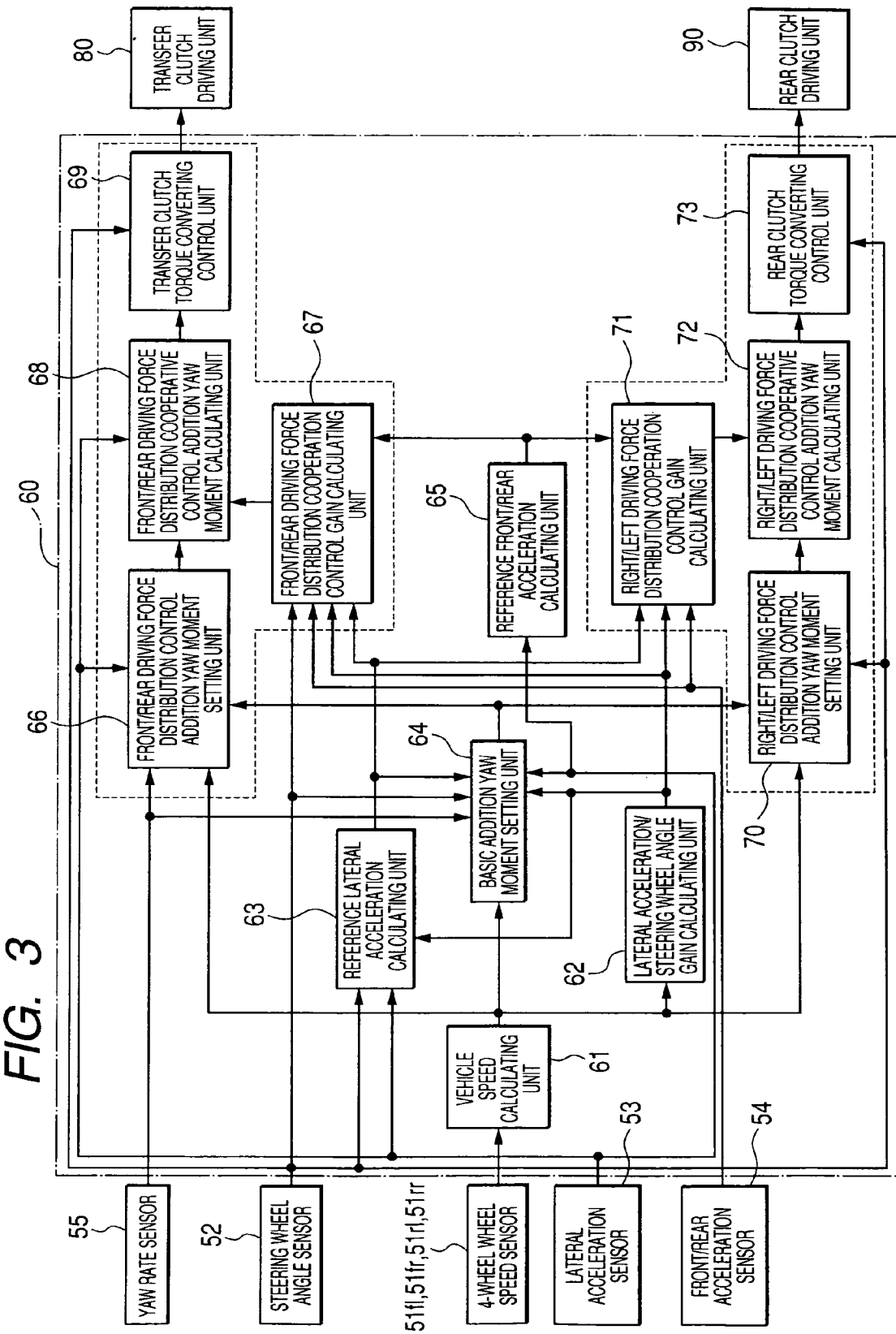
FIG. 3 is a functional block diagram for indicating a driving force distribution control unit.

In other words, as shown in FIG. 3, the driving force distribution control unit 60 has been mainly arranged by a vehicle speed calculating unit 61, a lateral acceleration/steering wheel angle gain calculating unit 62, a reference lateral acceleration calculating unit 63, a basic addition yaw moment setting unit 64, a reference front/rear acceleration calculating unit 65, a front/rear driving force distribution control addition yaw moment setting unit 66, a front/rear driving force distribution cooperative control gain calculating unit 67, a front/rear driving force distribution cooperative control addition yaw moment calculating unit 68, a transfer clutch torque converting control unit 69, a right/left driving force distribution control addition yaw moment setting unit 70, a right/left driving force distribution cooperative control gain calculating unit 71, a right/left driving force distribution cooperative control addition yaw moment calculating unit 72, and a rear clutch torque converting control unit 73.

To the vehicle speed calculating unit 61, sensor signals are entered from the vehicle speed sensors of the four wheels, namely, the wheel speeds ωfl, ωfr, ωrl, and ωrr of the respective vehicles 14*fl*, 14*fr*, 14*rl*, and 14*rr* are entered from the respective vehicle speed sensors 51*fl*, 51*fr*, 51*rl*, and 51*rr*. Then, for instance, the vehicle speed calculating unit 61 calculates a vehicle speed "V" (=(ωfl+ωfr+ωrl+ωrr)/4) by averaging these entered vehicle speeds ωfl, ωfr, ωrl, ωrr, and thereafter, outputs the calculated vehicle speed "V" to the lateral acceleration/steering wheel angle gain calculating unit 62, the basic addition yaw moment setting unit 64, the front/rear driving force distribution control addition yaw moment setting unit 66, and the right/left driving force distribution control addition yaw moment setting unit 70.

To the lateral acceleration/steering wheel angle gain calculating unit 62, the vehicle speed "V" is entered from the vehicle speed calculating unit 61. Then, this lateral acceleration/steering wheel angle gain calculating unit 62 calculates a lateral acceleration/steering wheel angle gain "Gy" in accordance with the below-mentioned formula (1), and then, outputs the calculated lateral acceleration/steering wheel angle gain "Gy" to the reference lateral acceleration calculating unit 63, the basic addition yaw moment setting unit 64, the front/rear driving force distribution cooperative control gain calculating unit 67, and the right/left driving force distribution cooperative control gain calculating unit 71.

$$Gy = (1/(1 + A \cdot V^2)) \cdot (V^2/L) \cdot (1/n) \qquad (1)$$

In this formula (1), symbol "A" indicates a stability factor, symbol "L" shows a wheel base, and symbol "n" represents a steering gear ratio.

To the reference lateral acceleration calculating unit 63, the steering wheel angle "θH" is inputted from the steering wheel angle sensor 52; the actual lateral acceleration ($d^2y/dt^2$) is inputted from the lateral acceleration sensor 53; and the lateral acceleration/steering wheel angle gain "Gy" is inputted from the lateral acceleration/steering wheel angle gain calculating unit 62. Then, this reference lateral acceleration calculating unit 63 calculates reference lateral acceleration ($d^2yr/dt^2$) from a drive condition of the vehicle, while this reference lateral acceleration indicates a relationship between lateral acceleration and actual lateral acceleration, which are predicted based upon a linear vehicle motion model. Then, this reference lateral acceleration calculating unit 63 outputs the calculated reference lateral acceleration to the basic addition yaw moment setting unit 64, the front/rear driving force distribution cooperative control gain calculating unit 67, and the right/left driving force distribution cooperative control gain calculating unit 71.

$$(d^2yr/dt^2)=(1/(1+Ty\cdot s))\cdot(d^2yss/dt^2) \quad (2)$$

In this formula (2), symbol "s" shows a differential operator, symbol "Ty" indicates a primary delay time constant of the lateral acceleration, and symbol "($d^2yss/dt^2$)" represents symbol-added reference lateral acceleration without considering a delay. This symbol-added reference lateral acceleration ($d^2yss/dt^2$) without considering the delay is set as follows:

$$\text{In case of: } \theta H \geq 0 \text{ - - - } (d^2yss/dt^2)=(d^2ysm/dt^2) \quad (3)$$

$$\text{In case of: } \theta H < 0 \text{ - - - } (d^2yss/dt^2)=-(d^2ysm/dt^2) \quad (4)$$

In this case, symbol ($d^2ysm/dt^2$) indicates non-symbol reference lateral acceleration which is saturated by symbol ($d^2yx/dt^2$) (will be explained later).

That is to say, symbol ($d^2yx/dt^2$) shows quasi-lateral acceleration which saturates the reference lateral acceleration, and is calculated based upon either the below-mentioned formula (5) or formula (6):

$$\text{In case of: } (d^2y/dt^2)<10 \text{ - - - } (d^2yx/dt^2)=Gy\cdot\theta H\text{Max}$$
$$((10-(d^2y/dt^2))/10)+(d^2y/dt^2) \quad (5)$$

$$\text{In case of: } (d^2y/dt^2)\geq 10 \text{ - - - } (d^2yx/dt^2)=10 \quad (6)$$

Figure 11:
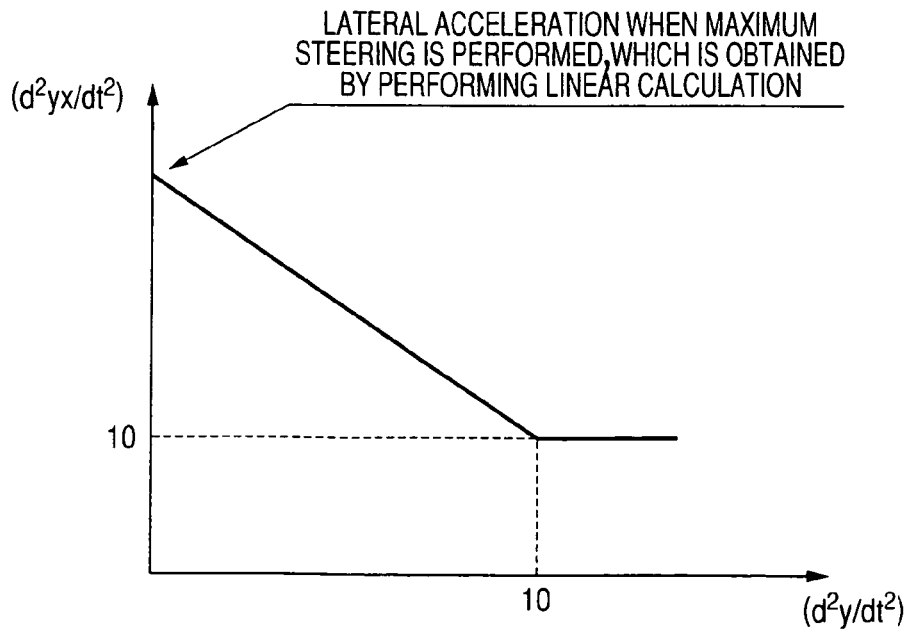
FIG. 11 is an explanatory diagram for explaining a characteristic of quasi-lateral acceleration which saturates basic lateral acceleration with respect to actual lateral acceleration.

In the formula (5), symbol "θHMax" indicates a maximum steering wheel angle. When the quasi-lateral acceleration ($d^2yx/dt^2$) which saturates the reference lateral acceleration set in the above-explained formulae (5) and (6) is represented by a characteristic diagram, such a characteristic diagram shown in FIG. 11 is given. In this embodiment mode, for instance, the reference lateral acceleration is saturated by 10 m/s$^2$.

Also, assuming now that such a non-symbol reference lateral acceleration which has been linearly calculated with respect to the steering wheel angle corresponds to ($d^2ysl/dt^2$), this non-symbol reference lateral acceleration is calculated based upon the below-mentioned formula (7):

$$(d^2ysl/dt^2)=Gy\cdot|\theta H| \quad (7)$$

Then, assuming now that a difference of ($d^2yx/dt^2$) from ($d^2ysl/dt^2$) is defined as ($d^2yd/dt^2$) (=($d^2ysl/dt^2$)−($d^2xy/dt^2$)), non-symbol reference lateral acceleration ($d^2ysm/dt^2$) which is saturated by ($d^2yx/dx^2$) is calculated based upon either the below-mention formula (8) or formula (9):

$$\text{In case of: } (d^2y/dt^2)<0 \text{ - - - } (d^2ysm/dt^2)=(d^2ysl/dt^2)-$$
$$(d^2yd/dt^2) \quad (8)$$

$$\text{In case of: } (d^2yd/dt^2)\geq 0 \text{ - - - } (d^2ysm/dt^2)=(d^2ysl/dt^2) \quad (9)$$

Figure 12:
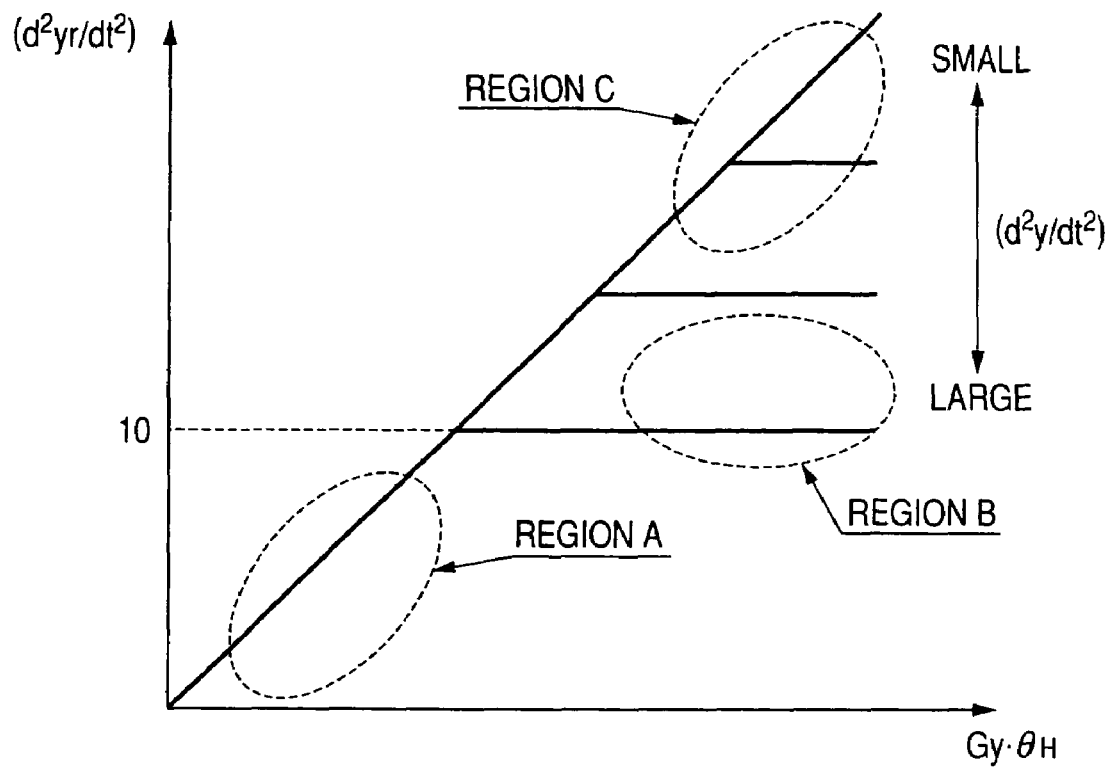
FIG. 12 is an explanatory diagram for explaining a characteristic of reference lateral acceleration with respect to a value obtained by multiplying a lateral acceleration/steering wheel angle gain by a steering wheel angle.

A characteristic of the reference lateral acceleration ($d^2yr/dt^2$) is represented in FIG. 12, while this reference lateral acceleration indicates a relationship between actual lateral acceleration and lateral acceleration which is predicted based upon the linear vehicle motion model from the set drive condition of the vehicle. The reference lateral acceleration ($d^2yr/dt^2$) is set in such a manner that when a road surface "μ" is high and the actual lateral acceleration ($d^2y/dt^2$) is large, this reference lateral acceleration ($d^2yr/dt^2$) is suppressed to be a small value, and conversely, when a road surface "μ" is low and the actual lateral acceleration ($d^2y/dt^2$) is small in the relationship with (Gy·θH), this reference lateral acceleration ($d^2yr/dt^2$) takes a large value. Then, since the reference lateral acceleration ($d^2yr/dt^2$) is set in the above-explained manner, when the basic addition yaw moment setting unit 64 calculates basic addition yaw moment "Mzθ" by containing the reference lateral acceleration ($d^2yr/dt^2$) (will be explained later), it is possible to avoid excessively large turning round moment when the vehicle is largely steered on a low "μ" road.

To the basic addition yaw moment setting unit 64, the steering wheel angle "θH" is inputted from the steering wheel angle sensor 52; ($d^2y/dt^2$) is inputted from the lateral acceleration sensor 53; an actual yaw rate "γ" is inputted from the yaw rate sensor 55; the vehicle speed "V" is inputted from the vehicle speed calculating unit 61; a lateral acceleration/steering wheel angle gain "Gy" is inputted from the lateral acceleration/steering wheel angle gain calculating unit 60; and also, the reference lateral acceleration ($d^2yr/dt^2$) is inputted from the reference lateral acceleration calculating unit 63.

Then, the basic addition yaw moment setting unit 64 calculates the basic addition yaw moment "Mzθ" based upon these input signals, and then, outputs this calculated basic addition yaw moment "Mzθ" to the front/rear driving force distribution control addition yaw moment setting unit 66, and the right/left driving force distribution control addition yaw moment setting unit 70.

Figure 4:
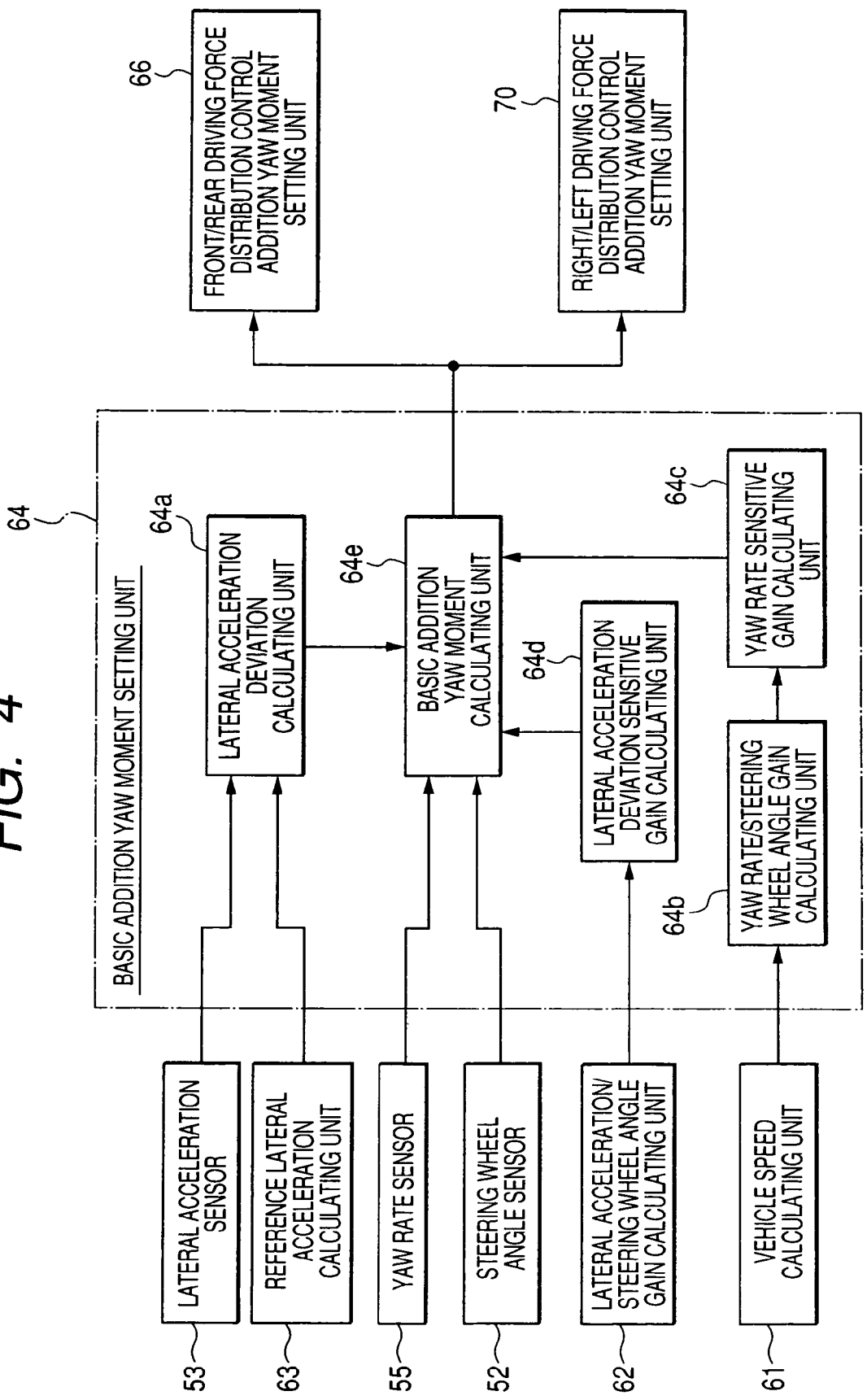
FIG. 4 is a functional block diagram for showing a basic addition yaw moment setting unit.

A structure of the basic addition yaw moment setting unit 64 will now be explained with reference to FIG. 4. This basic addition yaw moment setting 64 has been mainly arranged by a lateral acceleration deviation calculating unit 64a, a yaw rate/steering wheel angle gain calculating unit 64b, a yaw rate sensitive gain calculating unit 64c, a lateral acceleration deviation sensitive gain calculating unit 64d, and a basic addition yaw moment calculating unit 64e.

To the lateral acceleration deviation calculating unit 64a, the actual lateral acceleration ($d^2y/dt^2$) from the lateral acceleration sensor 53 is inputted; and the reference lateral acceleration ($d^2yr/dt^2$) from the reference lateral acceleration calculating unit 63 is inputted. Then, the lateral acceleration deviation calculating unit 64a calculates a lateral acceleration deviation ($d^2ye/dt^2$) based upon the below-mentioned formula (10), and outputs this calculated lateral acceleration deviation to the basic addition yaw moment calculating unit 64e.

$$(d^2ye/dt^2)=(d^2y/dt^2)-(d^2yr/dt^2) \quad (10)$$

The vehicle speed "V" from the vehicle speed calculating unit 61 is inputted to the yaw rate/steering wheel angle gain calculating unit 64b. The yaw rate/steering wheel angle gain calculating unit 64b calculates a yaw rate/steering wheel angle gain "Gγ" based upon the below-mentioned formula (11), and then, outputs the calculated yaw rate/steering wheel gain "Gγ" to the yaw rate sensitive gain calculating unit 64c.

$$G\gamma=(1/(1+A\cdot V^2))\cdot(V/L)\cdot(1/n) \quad (11)$$

The yaw rate/steering wheel angle gain "Gγ" from the yaw rate/steering wheel angle gain calculating unit 64b is entered to the yaw rate sensitive gain calculating unit 64c. Then, the yaw rate sensitive gain calculating unit 64c sets a yaw rate sensitive gain "Kγ" based upon the below-mentioned formula (12) by considering such a yaw rate sensitive gain "Kγ" that when a grip drive (($d^2ye/dt^2$)=0) is performed, Mzθ (normal value)=0, and then, outputs this set yaw rate sensitive gain "Kγ" to the basic addition yaw moment calculating unit 64e.

$$K\gamma = K\theta / G\gamma \quad (12)$$

In this formula (12), symbol "Kθ" indicates a steering angle sensitive gain. This steering angle sensitive gain "Kθ" may be calculated in accordance with the following formula (13):

$$K\theta = (Lf \cdot Kf)/n \quad (13)$$

In this formula (13), symbol "Lf" indicates a front wheel-to-gravity center distance, and symbol "Kf" shows equivalent cornering power of the front wheel.

The lateral acceleration/steering wheel angle gain "Gy" from the lateral acceleration/steering wheel angle gain calculating unit 62 is entered to the lateral acceleration deviation sensitive gain calculating unit 64d. Then, while such a value of Mzθ (normal value)=0 under the condition that the steering wheel is not completely operable on the extremely low μ road (namely, γ=0, $(d^2y/dt^2)$=0) is considered as a target value of a maximum value, the lateral acceleration deviation sensitive gain calculating unit 64d calculates a lateral acceleration deviation sensitive gain "Ky" based upon the below-mentioned formula (14), and then, outputs the calculated lateral acceleration deviation gain "Ky" to the basic addition yaw moment calculating unit 64e:

$$Ky = K\theta / Gy \quad (14)$$

To the basic addition yaw moment calculating unit 64e, the steering wheel angle "θH" from the steering wheel angle sensor 52 is inputted; the actual yaw rate "γ" from the yaw rate sensor 55 is inputted; the lateral acceleration deviation $(d^2ye/dt^2)$ from the lateral acceleration deviation calculating unit 64a is inputted; the yaw rate sensitive gain "Kγ" from the yaw rate sensitive gain calculating unit 64d is inputted; and also, the lateral acceleration deviation sensitive gain "Ky" from the lateral acceleration deviation sensitive gain calculating unit 64d is inputted.

Then, the basic addition yaw rate moment calculating unit 64e calculates basic addition yaw moment Mzθ in accordance with the below-mentioned formula (15), and outputs this calculated basic addition yaw moment Mzθ to both the front/rear driving force distribution control addition yaw moment setting unit 66 and the right/left driving force distribution control addition yaw moment setting unit 70.

$$Mz\theta = -K\gamma \cdot \gamma + Ky \cdot (d^2ye/dt^2) + K\theta \cdot \theta H \quad (15)$$

In other words, as indicated in this formula (15), a term of "-Kγ·γ" constitutes yaw moment which is sensible to the yaw rate "γ"; a term of "Kθ·θH" constitutes yaw moment which is sensible to the steering wheel angle "θH"; and a term of "Ky·$(d^2ye/dt^2)$" constitutes a corrected value of the yaw moment. As a result, in the case that the vehicle is driven in a high μ road with large lateral acceleration $(d^2y/dt^2)$, the addition yaw moment Mzθ also becomes a large value, so that motion performance of the vehicle may be improved. On the other hand, when the vehicle is driven in a low μ road, the above-described corrected value gives an influence to the addition yaw moment Mzθ, so that this addition yaw moment Mzθ is reduced. As a result, the stable driving performance can be achieved while the turning round characteristic is not increased.

On the other hand, returning back to FIG. 3, the actual lateral acceleration $(d^2y/dt^2)$ is inputted from the lateral acceleration sensor 53 to the reference front/rear acceleration calculating unit 65. Then, in order to calculate both a front/rear driving force distribution cooperative control gain "KcV", and a right/left driving force distribution cooperative control gain "KcY", the reference front/rear acceleration calculating unit 65 sets reference front/rear acceleration $(d^2xc/dt^2)$ used in such a case that emphasizing/deemphasizing of acceleration operations with respect to the road plane ".mu." are considered in accordance with the below-mentioned formula (16), formula (17), or formula (18). Thereafter, the reference front/rear acceleration calculating unit 65 outputs the calculated reference front/rear acceleration to both the front/rear driving force distribution cooperative control gain calculating unit 67 and the right/left driving force distribution cooperative control gain calculating unit 71:

In case of: $|d^2y/dt^2| \leq 1$ - - - $(d^2xc/dt^2)=$ (16)

In case of: $1 < |d^2y/dt^2| \leq 3$ - - - $(d^2xc/dt^2)=|d^2y/dt^2|$ (17)

In case of: $|d^2y/dt^2| > 3$ - - - $(d^2xc/dt^2)=3$ (18)

To the front/rear driving force distribution control addition yaw moment setting unit 66, the actual lateral acceleration $(d^2y/dt^2)$ from the lateral acceleration sensor 53 is entered; the actual yaw rate "γ" from the yaw rate sensor 55 is entered; the vehicle speed V from the vehicle speed calculating unit 61 is entered; and also the basic addition yaw-moment "Mzθ" from the basic addition yaw moment setting unit 64 is inputted.

Then, the front/rear driving force distribution control addition yaw moment setting unit 66 calculates front/rear driving force distribution control addition yaw moment "MVzθ" based upon these input signals, and thus, outputs this calculated front/rear driving force distribution control addition yow moment "MVzθ" to the front/rear driving force distribution cooperative control addition yaw moment calculating unit 68.

Figure 5:
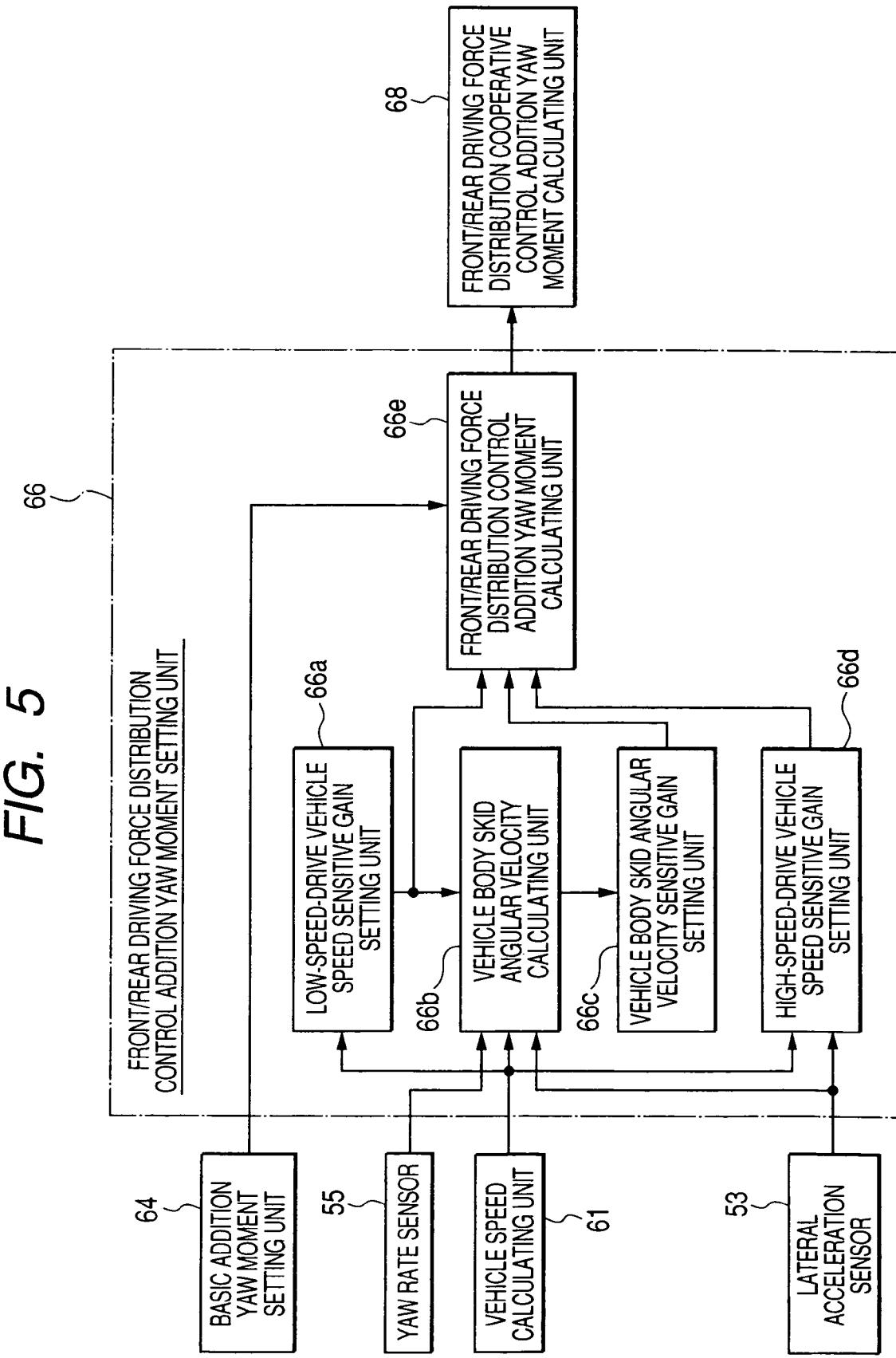
FIG. 5 is a functional block diagram for showing a front/rear driving force distribution control addition yaw moment setting unit.

Next, an arrangement of the front/rear driving force distribution control addition yaw moment setting unit 66 will now be explained with reference to FIG. 5. This front rear driving force distribution control addition yaw moment setting unit 66 has been mainly arranged by a low-speed-drive vehicle speed sensitive gain setting unit 66a, a vehicle body skid angular velocity calculating unit 66b, a vehicle body skid angular speed sensitive gain setting unit 66c, a high-speed-drive vehicle speed sensitive gain setting unit 66d, and a front/rear driving force distribution control addition yaw moment calculating unit 66e.

The vehicle speed "V" from the vehicle speed calculating unit 61 is entered to the low-speed-drive vehicle speed sensitive gain setting unit 66a. Then, for example, while referring to a map shown in FIG. 13, the low-speed-drive vehicle speed sensitive gain setting unit 66a sets a low-speed-drive vehicle speed sensitive gain "KVv1", and then, outputs this set low-speed-drive vehicle speed sensitive gain "KVv1" to both the vehicle body skid angular velocity calculating unit 66b and the front/rear driving force distribution control addition yaw moment calculating unit 66e.

Figure 13:
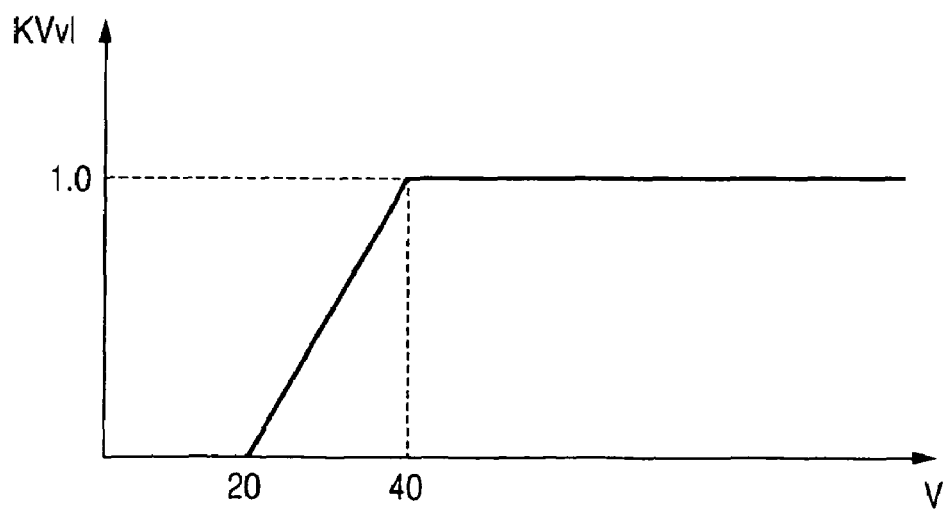
FIG. 13 is an explanatory diagram for explaining a characteristic of a vehicle speed sensitive gain during low drive speed with respect to a vehicle speed.

As also apparent from FIG. 13, this low-speed-drive vehicle speed sensitive gain KVv1 is set to be a small gain in order to avoid unnecessary front/rear driving force distribution control addition yaw moment MVzθ in a very low speed. More specifically, when the vehicle speed is lower than, or equal to 20 Km/h, the low-speed-drive vehicle sensitive gain KVv1 is set to 0(zero), and thus, it is so set that the front/rear driving force distribution control addition yaw moment MVzθ caused by the control operation is not effected.

To the vehicle body skid angular velocity calculating unit 66b, the actual lateral acceleration $(d^2y/dt^2)$ from the lateral acceleration sensor 53 is inputted; the actual yaw rate "γ"

from the yaw rate sensor 55 is inputted; the vehicle speed "V" from the vehicle speed calculating unit 61 is inputted; and also, the low-speed-drive vehicle speed sensitive gain "KVv1" from the low-speed-drive vehicle speed sensitive gain setting unit 66a is inputted.

Then, the vehicle body skid angular velocity calculating unit 66b calculates a vehicle body skid angular velocity (dβ/dt) based upon the below-mentioned formula (19), and thus, outputs this calculated vehicle body skid angular velocity (dβ/dt) to the vehicle body skid angular velocity sensitive gain setting unit 66c:

$$(d\beta/dt) = KVv1 \cdot |((d^2y/dt^2)/V) - \gamma| \qquad (19)$$

The vehicle body skid angular velocity (dβ/dt) from the vehicle body skid angular velocity calculating unit 66b is inputted to the vehicle body skid angular velocity sensitive gain setting unit 66c. For example, while referring to a map shown in FIG. 14, the vehicle body skid angular velocity sensitive gain setting unit 66c sets a vehicle body skid angular velocity sensitive gain KV(dβ/dt), and then, outputs this set vehicle body skid angular velocity sensitive gain KV(dβ/dt) to the front/rear driving force distribution control addition yaw moment calculating unit 66e.

Figure 14:
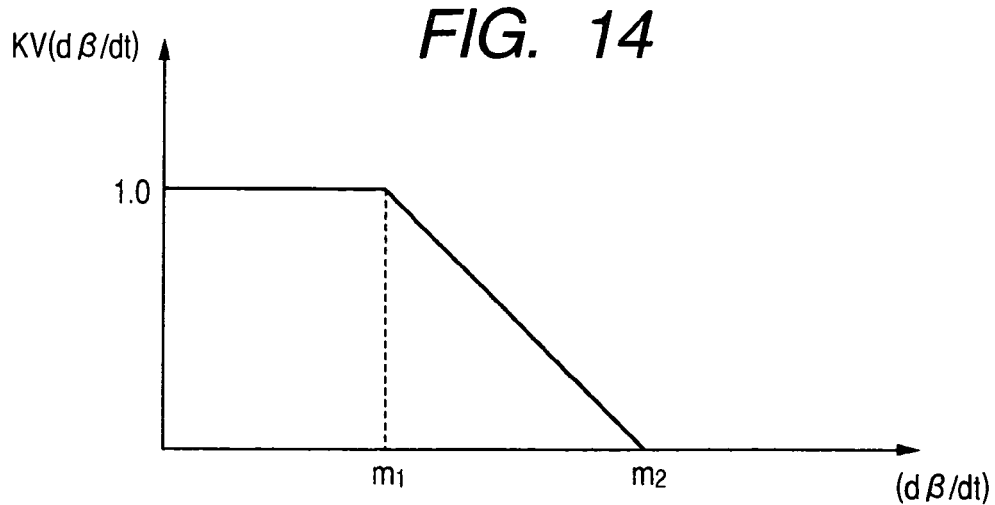
FIG. 14 is an explanatory diagram for explaining a characteristic of a vehicle speed sensitive gain during high drive speed with respect to a vehicle speed and actual lateral acceleration.

As also apparent from FIG. 14, this vehicle body skid angular velocity sensitive gain KV(dβ/dt) is set in order to suppress the excessive turning round characteristic in such a limiting area that the vehicle body skid angular velocity (dβ/dt) is large. In particular, in the case that the vehicle body skid angular velocity (dβ/dt) is larger than, or equal to m2, this vehicle body skid angular velocity sensitive gain KV(dβ/dt) is set to 0 (zero), and thus, it is so set that the front/rear driving force distribution control addition yaw moment MVzθ caused by the control operation is not effected.

Also, even in the limiting area, there is such an instantaneous event that the vehicle body skid angular velocity (dβ/dt) takes a small value in a transition manner. As a result, a recovery gradient of the vehicle body skid angular velocity sensitive gain KV(dβ/dt) is limited based upon the following formula (20):

$$KV(d\beta/dt)n \leq KV(d\beta/dt)n-1 + \Delta KV(d\beta/dt) \cdot \Delta t \qquad (20)$$

In this formula (20), symbol "KV(dβ/dt)n" shows a present vehicle body skid angular velocity sensitive gain KV(dβ/dt); symbol "KV(dβ/dt)n−1" represents a preceding vehicle body skid angular velocity sensitive gain KV(dβ/dt); and symbol "ΔKV" indicates a vehicle body skid angular velocity sensitive gain recovery gradient (namely, constant, for example, 0.3); and further, symbol "Δt" indicates a calculation period.

To the high-speed-drive vehicle velocity sensitive gain setting unit 66d, the actual lateral acceleration ($d^2y/dt^2$) from the lateral acceleration sensor 53 is inputted; and the vehicle speed "V" from the vehicle speed calculating unit 61 is inputted.

Thereafter, the high-speed-drive vehicle speed sensitive gain setting unit 66d firstly sets a vehicle speed sensitive term "KVvhv" of the high-speed-drive vehicle speed sensitive gain "KVvh" in accordance with the below-mentioned formula (21), formula (22), or formula (23):

In case of: $(3.6 \cdot V) \leq 60$ - - - $KVvhv = 1$ (21)

In case of: $60 < (3.6 \cdot V) < 120$ - - - $KVvhv = 1 - (((3.6 \cdot V) - 60)/(120-60))$ (22)

In case of: $(3.6 \cdot V) \geq 120$ - - - $KVvhv = 0$ (23)

Based upon the above-described vehicle speed sensitive term "KVvhv" of the high-speed-drive vehicle speed sensitive gain "KVvh", this high-speed-drive vehicle speed sensitive gain setting unit 66d sets the high-speed-drive vehicle speed sensitive gain "KVvh" in accordance with the below-mentioned formula (24), formula (25), or formula (26):

In case of: $|d^2y/dt^2| \leq 3$ - - - $KVvh = KVvhv$ (24)

In case of: $3 < |d^2y/dt^2| < 9$ - - - $KVvh = 1 \cdot ((|d^2y/dt^2|-3/(9-3)) + KVvhv \cdot ((9-|d^2y/dt^2|)/(9-3))$ (25)

In case of: $|d^2y/dt^2| \geq 9$ - - - $Kvvh = 1$ (26)

Figure 15:
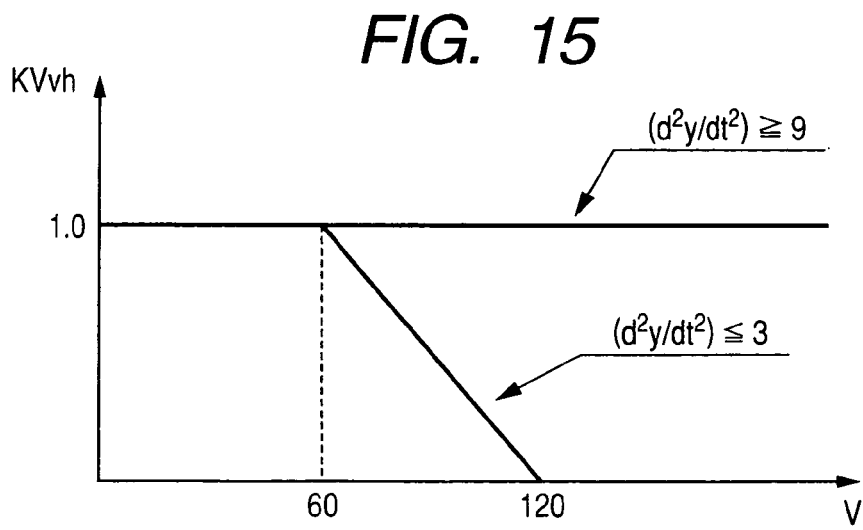
FIG. 15 is an explanatory diagram for explaining a characteristic of a vehicle body skid angular velocity sensitive gain with respect to a vehicle body skid angular velocity.

FIG. 15 shows a characteristic of the high-speed-drive vehicle speed sensitive gain "KVvh" which is calculated form the above-described formula (24) to formula (26). That is, if there is such a possibility that when the vehicle is driven in the high speed, the absolute value $|d^2y/dt^2|$ of the actual lateral acceleration is low ($|d^2y/dt^2| \leq 3$), and the vehicle is driven on the low μ road, then the excessive turning round characteristic is suppressed. As a result, the high-speed-drive vehicle speed sensitive gain "KVvh" may be set to a high sensitive gain.

To the front/rear driving force distribution control addition yaw moment calculating unit 66e, the basic addition yaw moment Mzθ from the basic addition yaw moment setting unit 64 is entered; the low-speed-drive vehicle speed sensitive gain "KVv1" from the low-speed-drive vehicle speed sensitive gain setting unit 66a is inputted; the vehicle body skid angular velocity sensitive gain KV(dβ/dt) from the vehicle body skid angular velocity sensitive gain setting unit 66c is entered; and the high-speed-drive vehicle speed sensitive gain KVvh from the high-speed-drive vehicle speed sensitive gain setting unit 66d is inputted.

Then, the front/rear driving force distribution control addition moment calculating unit 66e calculates front/rear driving force distribution control addition moment "MVzθ" based upon the below-mentioned formula (27), and thus, outputs the calculated front/rear driving force distribution control addition yaw moment MHzθ to the front/rear driving force distribution cooperative control addition yaw moment calculating unit 68:

$$MVz\theta = KVz\theta \cdot KVv1 - KVvh \cdot KV(d\beta/dt) \cdot Mz\theta \qquad (27)$$

In this formula (27), symbol "KVzθ" indicates a gain for determining an assist amount, namely, corresponds to a constant (for example, 1).

On the other hand, returning back to FIG. 3, to the front/rear driving force distribution cooperative control gain calculating unit 67, the steering wheel angle "θH" from the steering wheel angle sensor 52 is inputted; the actual front/rear acceleration ($d^2xe/dt^2$) from the front/rear acceleration sensor 54 is inputted; the lateral acceleration/steering wheel angle gain "Gy" from the lateral acceleration/steering wheel angle gain calculating unit 62 is inputted; the reference lateral acceleration ($d^2yr/dt^2$) from the reference lateral acceleration calculating unit 63 is inputted; and the reference front/rear acceleration ($d^2xc/dt^2$) from the reference front/rear acceleration calculating unit 65 is inputted.

Then, the front/rear driving force distribution cooperative control gain calculating unit 67 calculates a front/rear driving force distribution cooperative control gain "KcV" based upon either the below-mentioned formula (28) or formula (29), and thus, outputs the calculated front/rear driving force distribution cooperative control gain "KcV" to the front/rear driving force distribution cooperative control addition yaw moment calculating unit 68:

In case of: $Gy \cdot |\theta H| \leq 10$ - - - $KcV = 1$ (28)

In case of: $Gy \cdot |\theta H| > 10$ - - - $KcV - 1((Gy \cdot |\theta H| - (d^2yr/dt^2))/(Gy \cdot \theta HMax-10)) \cdot (|d^2xe/dt^2|/(d^2xc/dt^2))$ (29)

Note that $KcV \geq 0$.

Figure 16:
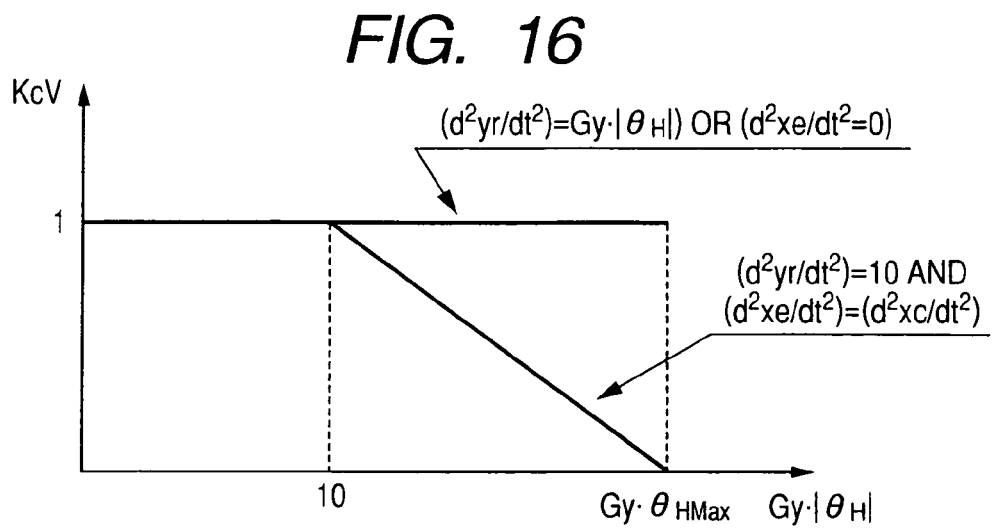
FIG. 16 is an explanatory diagram for explaining a characteristic of a vehicle speed sensitive gain during low drive speed with respect to a vehicle speed.

FIG. 16 shows a characteristic diagram for representing the above-explained formula (28) and formula (29). In this characteristic diagram, in such a case that $(d^2yr/dt^2)=10$ as well as $(d^2xe/dt^2/dt^2)=(d^2xc/dt^2)$, the front/rear driving force distribution cooperative control gain "KcV" has been set to become gradually low from such a point of "Gy·|θ|=10." This corresponds to a portion of a region "B" shown in FIG. 12. When it is so judged that the actual lateral acceleration $(d^2y/dt^2)$ is high and the road corresponds to the high μ road, the front/rear driving force distribution cooperative control gain "KcV" is set to be a low control gain, so that the control amount made by the front/rear driving force distribution control operation is reduced. Conversely, in the case that $(d^2yr/dt^2)=Gy·|θH|$, or $(d^2xe/dt^2)=0$, the front/rear driving force distribution cooperative control gain "KcV" is kept 1, so that the control amount is maintained as the present control amount.

To the front/rear driving force distribution cooperative control addition yaw moment calculating unit 68, the front/rear driving force distribution control addition yaw moment "MVzθ" from the front/rear driving force distribution control addition yaw moment setting unit 66 is inputted; and the front/rear driving force distribution cooperative control gain "KcV" from the front/rear driving force distribution cooperative control gain calculating unit 67 is entered.

Then, the front/rear driving force distribution cooperative control addition yaw moment calculating unit 68 calculates front/rear driving force distribution cooperative control addition yaw moment "MVzθc" in accordance with the below-mentioned formula (30), and thus, outputs the calculated front/rear driving force distribution cooperative control addition yaw moment "MVzθc" to the transfer clutch torque converting unit 69:

$$MVzθc = KcV \cdot MVzθ \qquad (30)$$

To the transfer clutch torque converting control unit 69, the steering wheel angle "θH" from the steering wheel angle sensor 52 is inputted; and the front/rear driving force distribution cooperative control addition yaw moment "MVzθc" from the front/rear driving force distribution cooperative control addition yaw moment calculating unit 68 is entered.

Then, the transfer clutch torque converting control unit 69 converts the front/rear driving force cooperative control addition yaw moment "MVzθc" into transfer clutch torque "TLSDV" based upon either the below-mentioned formula (31) or formula (32), and thus, outputs this converted transfer clutch torque "TSLDV" to the transfer clutch torque converting unit 80:

In case of: $θH \geq 0$ - - - $TLSDV = -KLSDV \cdot MVzθc$ \qquad (31)

In case of: $θH < 0$ - - - $TLSDV = -KLSDV \cdot MVzθc$ \qquad (32)

In these formulae (31) and (32), symbol "KLSDV" indicates a conversion coefficient (constant).

To the right/left driving force distribution control addition yaw moment setting unit 70, the steering wheel angle "θH" from the steering wheel angle sensor 52 is inputted; the vehicle speed "V" from the vehicle speed calculating unit 61 is inputted; and the basic addition yaw moment "Mzθ" from the basic addition moment setting unit 64 is entered.

Then, the right/left driving force distribution control addition yaw moment setting unit 70 calculates right/left driving force distribution control addition yaw moment "MYzθ" in response to these input signals, and thus, outputs this calculated right/left driving force distribution control addition yaw moment "MYzθ" to the right/left driving force distribution cooperative control addition yaw moment calculating unit 72.

Figure 6:
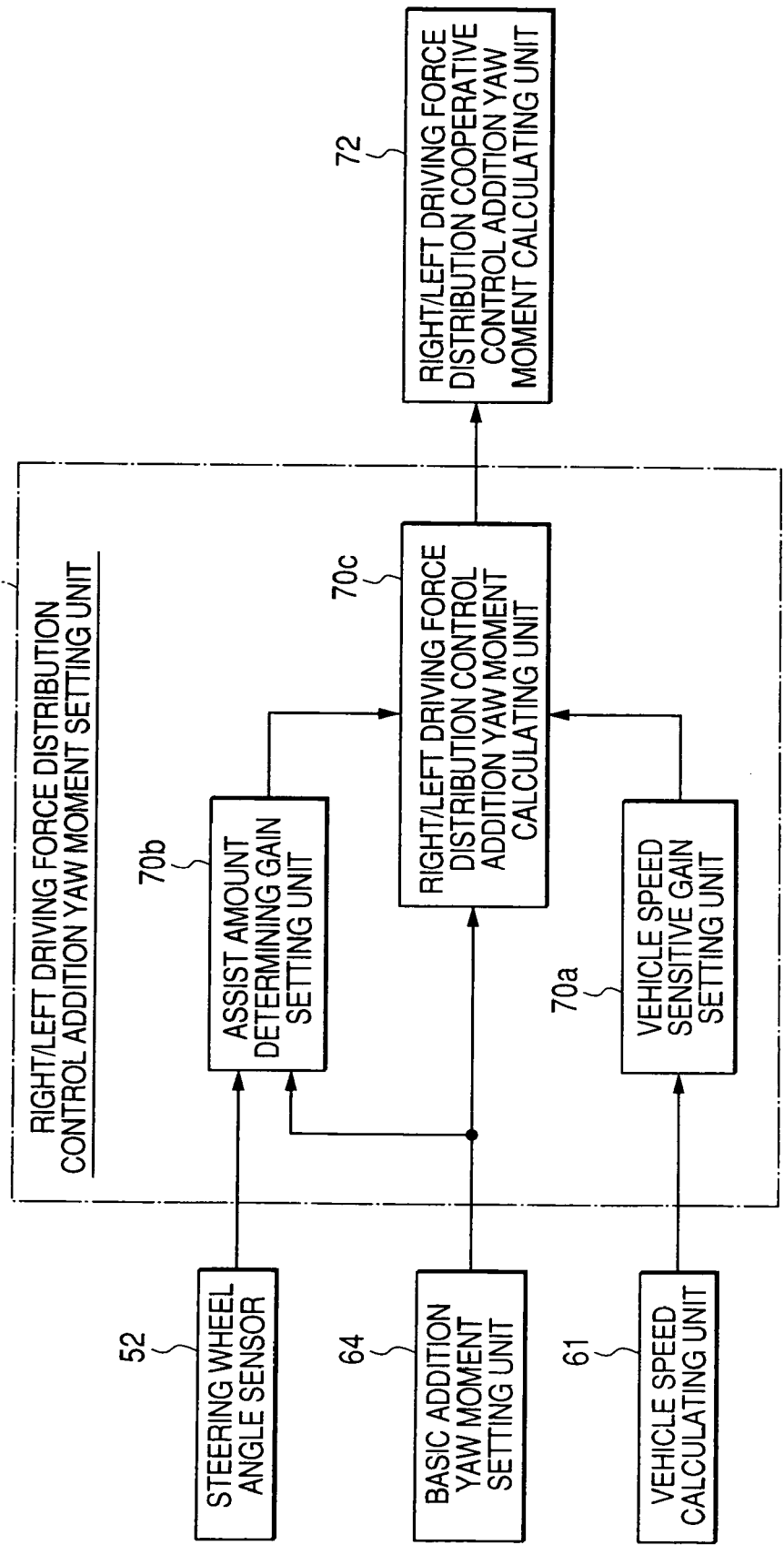
FIG. 6 is a functional block diagram for representing a right/left driving force distribution control addition yaw moment setting unit.

Referring now to FIG. 6, an arrangement of the right/left driving force distribution control addition yaw moment setting unit 70 will be explained. This right/left driving force distribution control addition yaw moment setting unit 70 has been mainly arranged by employing a vehicle speed sensitive gain setting unit 70a, an assist amount determining gain setting unit 70b, and a right/left driving force distribution control addition yaw moment calculating unit 70c.

The vehicle speed "V" from the vehicle speed calculating unit 61 is entered to the vehicle speed sensitive gain setting unit 70a. Then, while the vehicle speed sensitive gain setting unit 70a refers to, for example, a map indicated in FIG. 17, this vehicle speed-sensitive gain setting unit 70a sets a low-speed-drive vehicle speed sensitive gain "KYv1", and thus, outputs this set low-speed-drive vehicle speed sensitive gain "KYv1" to the right/left driving force distribution control addition yaw moment calculating unit 70c.

Figure 17:
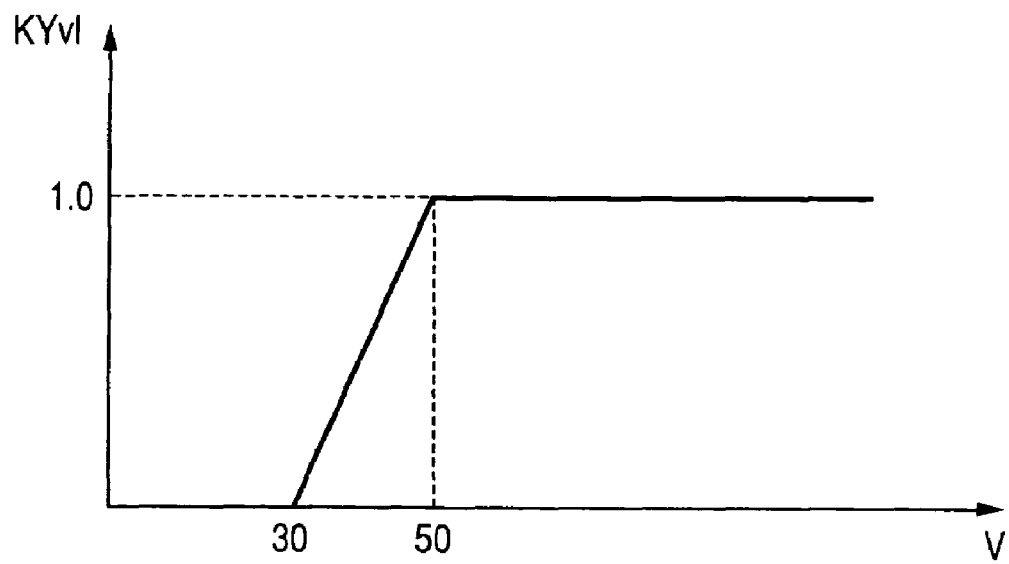
FIG. 17 is an explanatory diagram for explaining a characteristic of a front/rear driving force distribution cooperative control gain.

As also apparent from the map of FIG. 17, this low-speed-drive vehicle speed sensitive gain "KYv1" is set to a low sensitive gain in order to avoid unwanted right/left driving force distribution control addition yaw moment "MYzθ" in a very low speed. More specifically, in the case that the vehicle speed is lower than, or equal to 30 Km/h, the low-speed-drive vehicle speed sensitive gain "KYv1" is set to 0 (zero), and set in order that the right/left driving force distribution control addition yaw moment "MYzθ" caused by the control operation is not effected.

To the assist amount determining gain setting unit 70b, the steering wheel angle "θH" from the steering wheel angle sensor 52 is entered, and the basic addition yaw moment "Mzθ" from the basic addition yaw moment setting unit 64 is inputted.

Then, the assist amount determining gain setting unit 70b sets an assist amount determining gain "KYzθ" in accordance with either the below mentioned formula (33) or formula (34), and thus, outputs this set assist amount determining gain "KYzθ" to the right/left driving force distribution control addition yaw moment calculating unit 70c:

In such a case that the steering wheel angle "θH" and the basic addition yaw moment "Mzθ" own the same symbols (namely, presently under steering condition), $$KYzθ = 0.1 \qquad (33)$$

In such a case that the steering wheel angle "θH" and the basic addition yaw moment "Mzθ" own different symbols (namely, presently over steering condition), $$KYzθ = 0.05 \qquad (34)$$

To the right/left driving force distribution control addition yaw moment calculating unit 70c, the basic addition yaw moment "Mzθ" from the basic addition yaw moment setting unit 64 is entered; the low-speed-drive vehicle speed sensitive gain "KYv1" from the vehicle speed sensitive gain setting unit 70a is entered; and the assist amount determining gain "KYzθ" from the assist amount determining gain setting unit 70b is entered.

Then, the right/left driving force distribution control addition yaw moment calculating unit 70c calculates right/left driving force distribution control addition yaw moment "MYzθ" based upon the below-mentioned formula (35), and thus, outputs the calculated right/left driving force distribution control addition yaw moment "MYzθ" to the right/left driving force distribution cooperative control addition yaw moment calculating unit 72:

$$MYzθ = KYzθ \cdot KVv1 \cdot Mzθ \qquad (35)$$

On the other hand, returning back to FIG. 3, to the right/left driving force distribution cooperative control gain calculating unit 71, the actual front/rear acceleration ($d^2xe/dt^2$) from the front/rear acceleration sensor 54 is entered; the lateral acceleration/steering wheel angle gain "Gy" from the lateral acceleration/steering wheel angle gain calculating unit 62 is inputted; the reference lateral acceleration ($d^2yr/dt^2$) from the reference lateral acceleration calculating unit 63 is inputted; and also, the reference front/rear acceleration ($d^2xc/dt^2$) from the reference front/rear acceleration calculating unit 65 is inputted.

Then, the right/left driving force distribution cooperative control gain calculating unit 71 calculates a right/left driving force distribution cooperative control gain "KcY" based upon either the below-mentioned formula (36) or formula (37), and thus, outputs the calculated right/left driving force distribution cooperative control gain "KcY" to the right/left driving force distribution cooperative control addition yaw moment calculating unit 72:

In case of: $(d^2yr/dt^2) \leq 10$ - - - $KcY=1$ (36)

In case of: $(d^2yr/dt^2) > 10$ - - - $KcY=1-(((d^2yr/dt^2)-10)/(Gy \cdot \theta HMax-10)) \cdot (|d^2xe/dt^2|/(d^2xc/dt^2))$ (37)

Note that $KcY \geq 0$.

Figure 18:
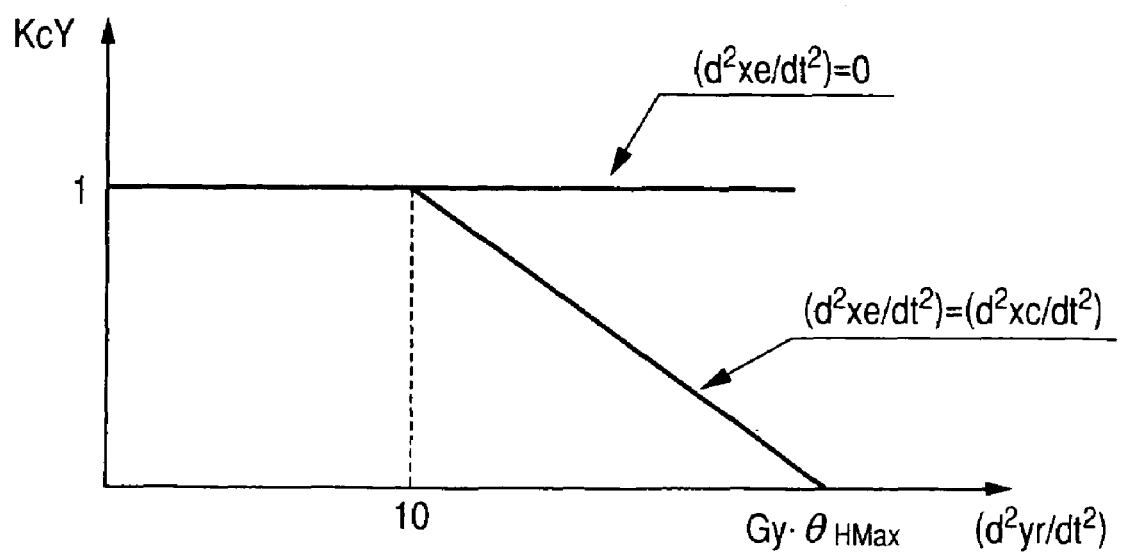
FIG. 18 is an explanatory diagram for explaining a characteristic of a right/left driving force distribution cooperative control gain.

FIG. 18 is a characteristic diagram for indicating the above-explained formula (36) and formula (37). In the case that it becomes $(d^2yr/dt^2)>10$, and $(d^2xe/dt^2)=(d^2xc/dt^2)$, the right/left driving force distribution cooperation control gain "KcY" has been set to be gradually low from such a point of $(d^2yr/dt^2)=10$. This corresponds to the portion of the region C shown in FIG. 12. When it is so judged that the actual lateral acceleration ($d^2y/dt^2$) is low, namely a low μ road, the right/left driving force operative control gain "KcY" is set to be a low control gain, so that the control amount by the right/left driving force distribution control is lowered.

To the right/left driving force distribution cooperative control addition moment calculating unit 72, the right/left driving force distribution control addition moment "MYzθ" from the right/left driving force distribution control yaw moment setting unit 70 is inputted; and the right/left driving force distribution cooperative control gain "KcY" from the right/left driving force distribution cooperative control gain calculating unit 71 is entered.

Then, the right/left driving force distribution cooperative control addition yaw moment calculating unit 72 calculates right/left driving force distribution force distribution cooperative control addition yaw moment "MYzθc" based upon the below-mentioned formula (38), and thus, outputs the calculated right/left driving force distribution cooperative control addition yaw moment "MYzθc" to the rear clutch torque converting control unit 73:

$MYz\theta c = KcY \cdot MYz\theta$ (38)

To rear clutch torque converting control unit 73, the steering wheel angle "θH" from the steering wheel angle sensor 52 is inputted, and the right/left driving force distribution cooperative control addition yaw moment "MYzθc" from the right/left driving force distribution cooperative control addition yaw moment calculating unit 72 is inputted.

Then, the rear clutch torque converting control unit 73 converts the right/left driving force distribution cooperative control addition yaw moment "MYzθc" into rear clutch torque "TRY" based upon the below-mentioned formula (39), and thus, outputs the converted rear clutch torque "TRY" to the rear clutch torque driving unit 90:

$TRY = KRY \cdot MYz\theta c$ (39)

In this formula (39), symbol "KRY" indicates a converting coefficient (constant). In the case that $\theta H \geq 0$ and the vehicle is driven under left turning condition, the converted rear clutch torque "TRY" is increased in such a manner that the second oil pressure multi-plate clutch 49 shown in FIG. 2 is actuated, whereas in the case that $\theta H < 0$ and the vehicle is driven under right turning condition, the converted rear clutch torque "TRY" is increased in such a manner that the first oil pressure multi-plate clutch 48 shown in FIG. 2 is actuated.

As previously explained, in this embodiment mode, the front/rear driving force distribution control addition yaw moment setting unit 66, the front/rear driving force distribution cooperative control gain calculating unit 67, the front/rear driving force distribution cooperative control addition yaw moment calculating unit 68, and the transfer clutch torque converting control unit 69 mainly constitute such a portion for executing the front/rear driving force distribution control operation. Also, the right/left driving force distribution control addition yaw moment setting unit 70, the right/left driving force distribution cooperative control gain calculating unit 71, the right/left driving force distribution cooperative control addition yaw moment calculating unit 72, and the rear clutch torque converting control unit 73 mainly constitute such a portion for executing the right/left driving force distribution control operation.

It should be understand that in this embodiment mode, although the actual front/rear acceleration ($d^2xe/dt^2$) is obtained from the front/rear acceleration sensor 54, this actual acceleration ($d^2xe/dt^3$) may be alternatively predicted in accordance with the below-mentioned formula (40):

$(d^2xe/dt^2) = ((TCD \cdot GFIN)/Rt)/mv$ (40)

In this formula (40), symbol "TCD" indicates center differential input torque (namely, predicted value based upon engine torque and transmission gear ratio), symbol "GFIN" shows a final gear ratio, symbol "Rt" represents a tire diameter, and symbol "mv" is vehicle mass.

Next, a description is made of the above-described driving force distribution control operations with reference to a flow chart shown in FIG. 7. First, in a step (will be abbreviated as "S" hereinafter) 101, necessary parameters are read. That is, the vehicle speeds ωfl, ωfr, ωrl, ωrr derived from the vehicle wheel speed sensors 51fl, 51fr, 51rl, 51rr are read; the steering wheel angle "θH" derived from the steering wheel angle sensor 53 is read; the actual lateral acceleration ($d^2y/dt^2$) derived from the lateral acceleration sensor 53 is read; the actual front/rear acceleration ($d^2xe/dt^2$) derived from the front/rear acceleration sensor 54 is read; and also, the actual Yaw rate "γ" derived from the yaw rate sensor 55 is read.

Next, the driving force distribution control operation is advanced to an S102 in which the necessary parameters are calculated. In other words, the lateral acceleration/steering wheel angle gain "Gy" is calculated by the lateral acceleration/steering wheel angle gain calculating unit 62; the vehicle speed "V" is calculated by the vehicle speed calculating unit 61; the reference lateral acceleration ($d^2yr/dt^2$) is calculated by the reference lateral acceleration calculating unit 63; and the basic addition yaw moment "Mzθ" is calculated by the basic addition yaw moment setting unit 64. In this connection, the calculation of the basic addition yaw moment "Mzθ" is carried out by a basic addition yaw moment setting routine (will be explained later) shown in FIG. 8.

Next, the control operation is advanced to S103 in which a front/rear driving force distribution cooperative control operation (will be explained in FIG. 9) is executed. Then, the control operation is advanced to S104 in which a right/left driving force distribution cooperation control operation (will be explained in FIG. 10) is executed, and thereafter, the present control operation program is returned.

As shown in FIG. 8, the above-explained basic addition yaw moment setting routine is executed as follows. That is, in S201, the yaw rate/steering wheel angle gain calculating unit 64b first calculates a yaw rate/steering wheel angle gain "Gγ."

Next, the setting routine program is advanced to S202 in which the yaw rate sensitive gain calculating unit 64c calculates a yaw rate sensitive gain "Kγ."

Subsequently, the setting routine program is advanced to S203 in which the lateral acceleration deviation sensitive gain calculating unit 64d calculates a lateral acceleration deviation sensitive gain "Ky."

Next, the setting routine program is advanced to S204 in which the lateral acceleration deviation calculating unit 64a calculates a lateral acceleration deviation ($d^2ye/dt^2$).

Then, the setting routine program is advanced to S205 in which the basic addition yaw moment calculating unit 64e calculates basic addition yaw moment "Mzθ", and thus, outputs the calculated basic addition yaw moment "Mzθ." Thereafter, the basic addition yaw moment setting routine is returned to the main control program.

Figure 9:
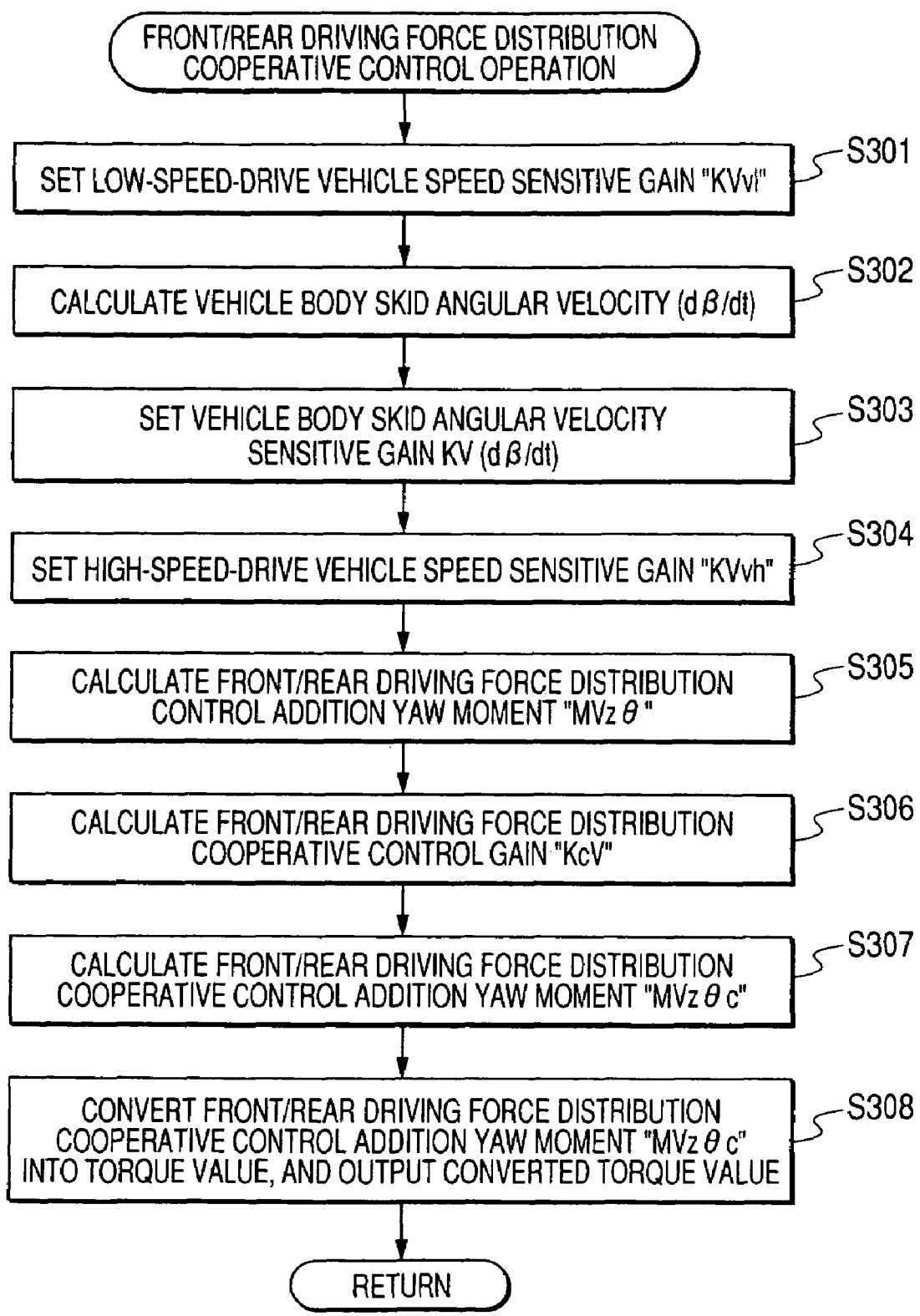
FIG. 9 is a flow chart for describing a front/rear driving force distribution cooperative control operation.

Next, the front/rear driving force distribution cooperative control operation executed in the above-described S103 will now be explained with reference to a flow chart of FIG. 9.

Firstly, in S301, the low-speed-drive vehicle speed sensitive gain setting unit 66a sets a low-speed-drive vehicle speed sensitive gain "KVvl."

Next, the cooperative control operation is advanced to S302 in which the vehicle body skid angular velocity calculating unit 66b calculates vehicle body skid angular velocity (dβ/dt).

Next, the cooperative control operation is advanced to S303 in which the vehicle body skid angular velocity gain setting unit 66c sets a vehicle body skid angular velocity sensitive gain KV(dβ/dt).

Next, the cooperative control operation is advanced to S304 in which the high-speed-drive vehicle speed sensitive gain setting unit 66d sets a high-speed-drive vehicle speed sensitive gain "KVvh."

Next, the cooperative control operation is advanced to S305 in which the front/rear driving force distribution control addition yaw moment calculating unit 66e calculates the front/rear driving force distribution control addition yaw moment "MVzθ."

Next, the cooperative control operation is advanced to S306 in which the front/rear driving force distribution cooperative control gain calculating unit 67 calculates a front/rear driving force distribution cooperative control gain "KcV."

Next, the cooperative control operation is advanced to S307 in which the front/rear driving force distribution cooperative control addition yaw moment calculating unit 68 calculates front/rear driving force distribution cooperative control addition yaw moment "MVzθc."

Then, the cooperative control operation is advanced to S308 in which the transfer clutch torque converting control unit 69 converts the front/rear driving force distribution cooperative control addition yaw moment "MVzθc" into transfer clutch torque "TLSDV", and thus, outputs this converted transfer clutch torque "TLSDV" to the transfer clutch torque driving unit 80.

Figure 10:
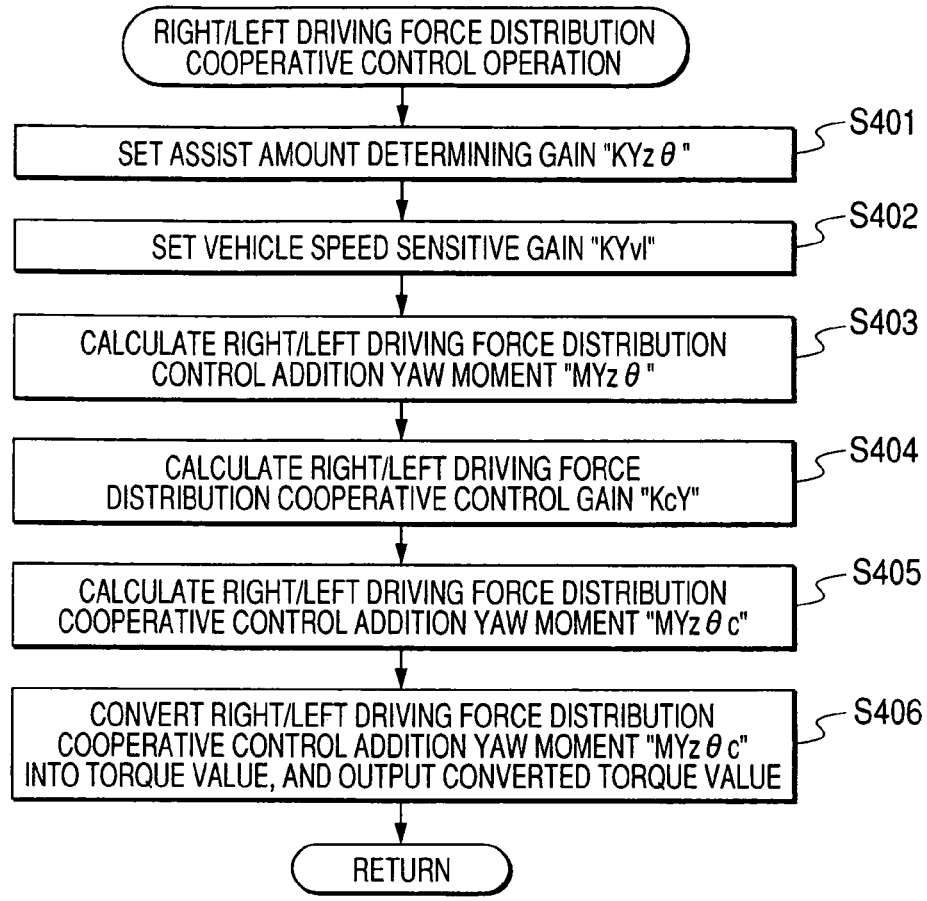
FIG. 10 is a flow chart for describing a right/left driving force distribution cooperative control operation.

Next, the front/rear driving force distribution cooperative control operation executed in the above-described S104 will now be explained with reference to a flow chart of FIG. 10.

Firstly, in S401, the assist amount determining gain setting unit 70b sets an assist amount determining gain "KYzθ."

Next, the cooperative control operation is advanced to S402 in which the vehicle speed sensitive gain setting unit 70a sets a low-speed-drive vehicle speed sensitive gain "KYv1."

Next, the cooperative control operation is advanced to S403 in which the right/left driving force distribution control addition yaw moment calculating unit 70c calculates right/left driving force distribution control addition yaw moment "MYzθ."

Next, the cooperative control operation is advanced to S404 in which the right/left driving force distribution cooperative control gain calculating unit 71 calculates a right/left driving force distribution cooperative control gain "KcY."

Next, the cooperative control operation is advanced to S405 in which the right/left driving force distribution cooperative control addition yaw moment calculating unit 72 calculates right/left driving force distribution cooperative control addition yaw moment "MYzθc."

Then, the cooperative control operation is advanced to S406 in which the rear clutch torque converting control unit 73 converts the right/left driving force distribution cooperative control addition yaw moment "MYzθc" into rear clutch torque "TRY", and thus, outputs this converted rear clutch torque "TRY" to the rear clutch torque driving unit 90. Thereafter, this cooperative control operation is returned to the main control program.

As previously explained, in accordance with the embodiment mode of the present invention, in FIG. 12, in the region A, in order to improve the steering response characteristic in both the normal region (steering in grip region) and the gradual accelerating region with respect to the road plane "μ", both the front/rear driving force distribution control operation and the right/left driving force distribution control operation are carried out under the normal condition.

Also, in the region B, when the vehicle is driven on the high μ road and in the limiting travel (steering+accelerating), in order to improve the control operation, the right/left driving force distribution control operation is carried out under the normal condition. The front/rear driving force distribution control operation in view of the turning round characteristic is carried out in such a manner that the driving force is distributed to the rear wheel side. While the gripping effect of the rear inner wheel when the right/left driving force distribution control operation is actuated is secured (namely, in order to avoid that differential rotating number between right/left rear wheels becomes excessively large, and thus, torque distribution amount of right/left driving force distribution control operation is decreased), and also, the front inner wheel slip is prevented (in particular, vehicle which is not equipped with front differential limiting apparatus), the control amount of the front/rear driving force distribution control operation is decreased.

Further, in the region C, when the vehicle is driven on the low .mu. road and in the limiting travel (steering+accelerating), in order to improve the control operation, the right/left driving force distribution control operation is carried out under the normal condition, when the right/left driving force distribution control operation is carried out, the slip ratio of the rear inner wheel is decreased, depending upon the torque distribution of the turning round direction, and in some cases, the gripping effect of the rear inner wheel along the lateral direction is recovered, so that the desirable moment cannot be added. As a consequence, the control amount of the right/left driving force distribution control operation is decreased.

As explained above, both the front/rear driving force distribution control operation and the right/left driving force distribution control operation can be properly actuated while the maximum effects can be achieved in the various traveling scenes of the vehicle. As a consequence, both the stability and the turning around characteristic of the vehicle can be maintained under the optimum conditions.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A driving force distribution control apparatus, comprising:
   a front/rear driving force distribution controller for controlling a driving force distribution between a front wheel side and a rear wheel side; and
   a right/left driving force distribution controller for controlling a driving force distribution between a left wheel and a right wheel of at least one of the front wheel side and the rear wheel side,
   when a predetermined steering drive condition on a high μ road is satisfied, a control amount by the front/rear driving force distribution controller is decreased in response to at least an accelerating condition, when a predetermined steering drive condition on a low μ road is satisfied, a control amount set by the right/left driving force distribution controller is decreased in response to at least the accelerating condition, and
   wherein the predetermined steering drive condition on a high μ road and the predetermined steering drive condition on a low μ road are set based on a relationship between lateral acceleration predicted based on a linear vehicle motion model from an operating condition of the vehicle and lateral acceleration actually generated on the vehicle.

2. The driving force distribution control apparatus according to claim 1, wherein the front/rear driving force distribution controller calculates a value of yaw moment required in the control operation, and calculates the control amount based on at least the calculated yaw moment value.

3. The driving force distribution control apparatus according to claim 2, when a vehicle speed is determined to be a very low speed smaller than a preset first speed value, the front/rear driving force distribution controller corrects the control amount to become a small control amount.

4. The driving force distribution control apparatus according to claim 2, when a vehicle speed is a high speed larger than a preset speed value and an absolute value of lateral acceleration actually generated in the vehicle is smaller than a preset value, the front/rear driving force distribution controller corrects the control amount to become a small control amount.

5. The driving force distribution control apparatus according to claim 2, when a vehicle body skid angular velocity is larger than a preset value, the front/rear driving force distribution controller corrects the control value to become a small control amount.

6. The driving force distribution control apparatus according to claim 1, wherein the right/left driving force distribution controller calculates a value of yaw moment required in the control operation, and calculates the control amount based on at least the calculated yaw moment value.

7. The driving force distribution control apparatus according to claim 6, wherein the right/left driving force distribution controller determines an under steering condition and an over steering condition, when the vehicle is in the over steering condition, the right/left driving force distribution controller sets the control amount to be decreased, as compared with a control amount when the vehicle is in the under steering condition.

8. The driving force distribution control apparatus according to claim 6, when a vehicle speed is determined to be a very low speed smaller than a preset speed value, the right/left driving force distribution controller corrects the control amount to become a small control amount.

9. The driving force distribution control apparatus according to claim 1, when neither the predetermined steering drive condition on the high μ road nor the predetermined steering drive condition on the low μ road is satisfied, the control amount by the front/rear driving force distribution controller is a normal amount and the control amount by the right/left driving force distribution controller is a normal amount, when the predetermined steering drive condition on the high μ road is satisfied, the control amount set by the front/rear driving force distribution controller is decreased than the normal amount, and the control amount set by the right/left driving force distribution controller is the normal amount, when the predetermined steering drive condition on the low μ road is satisfied, the control amount set by the right/left driving force distribution controller is decreased than the normal amount, and the control amount set by the front/rear driving force distribution controller is the normal amount.

10. A driving force distribution control apparatus, comprising:
    a front/rear driving force distribution controller for controlling a driving force distribution between a front wheel side and a rear wheel side; and
    a right/left driving force distribution controller for controlling a driving force distribution between a left wheel and a right wheel of at least one of the front wheel side and the rear wheel side,
    when a predetermined steering drive condition on a high μ road is satisfied, a control amount by the front/rear driving force distribution controller is decreased in response to at least an accelerating condition, when a predetermined steering drive condition on a low μ road is satisfied, a control amount set by the right/left driving force distribution controller is decreased in response to at least the accelerating condition, and
    when a vehicle speed is a high speed larger than a preset speed value and an absolute value of lateral acceleration actually generated in the vehicle is smaller than a preset value, the front/rear driving force distribution controller corrects the control amount to become a small control amount.

11. A driving force distribution control apparatus, comprising:
    a front/rear driving force distribution controller for controlling a driving force distribution between a front wheel side and a rear wheel side; and
    a right/left driving force distribution controller for controlling a driving force distribution between a left wheel and a right wheel of at least one of the front wheel side and the rear wheel side,
    when a predetermined steering drive condition on a high μ road is satisfied, a control amount by the front/rear driving force distribution controller is decreased in response to at least an accelerating condition, when a predetermined steering drive condition on a low μ road is satisfied, a control amount set by the right/left driving force distribution controller is decreased in response to at least the accelerating condition, and when a vehicle speed is determined to be a very low speed smaller than a preset speed value, the right/left driving force distribution controller corrects the control amount to become a small control amount.

12. The driving force distribution control apparatus according to claim 1, wherein when the predetermined steering drive condition on a high μ road is satisfied, the control amount by the front/rear driving force distribution controller is decreased based on a front/rear acceleration.

13. The driving force distribution control apparatus according to claim 1, wherein when the predetermined steering drive condition on a low μ road is satisfied, wherein said control amount set by the fight/left driving force distribution controller is decreased based on a front/rear acceleration.

14. The driving force distribution control apparatus according to claim 1, wherein when the predetermined steering drive condition on a high μ road is satisfied, the control amount by the front/rear driving force distribution controller is decreased based on a ratio of a front/rear acceleration to a reference front/rear acceleration which is calculated based on a lateral acceleration.

15. The driving force distribution control apparatus according to claim 1, wherein when the predetermined steering drive condition on a low μ road is satisfied, wherein said control amount set by the right/left driving force distribution controller is decreased based on a ratio of a front/rear acceleration to a reference front/rear acceleration which is calculated based on a lateral acceleration.

16. The driving force distribution control apparatus according to claim 1, wherein the front/rear driving force distribution controller controls the driving force distribution between a front wheel side and a rear wheel side such that the sum of a distributed driving force to the front wheel side and a distributed driving force to the rear wheel side is equal to an inputted driving force to a front/rear driving force distribution mechanism.

17. The driving force distribution control apparatus according to claim 1, wherein the left/right driving force distribution controller controls the driving force distribution a left wheel and a right wheel of at least one of the front wheel side and the rear wheel side such that the sum of distributed driving forces to the right and left wheel of at least one of the front wheel side and the rear wheel side is equal to an inputted driving force to a left/right driving force distribution mechanism.

* * * * *